(12) United States Patent
Sasaki et al.

(10) Patent No.: US 8,325,441 B2
(45) Date of Patent: Dec. 4, 2012

(54) THERMALLY ASSISTED MAGNETIC HEAD, METHOD OF MANUFACTURING THE SAME, HEAD GIMBAL ASSEMBLY, AND HARD DISK DRIVE

(75) Inventors: Yoshitaka Sasaki, Milpitas, CA (US);
Hiroyuki Ito, Milpitas, CA (US);
Hironori Araki, Milpitas, CA (US);
Shigeki Tanemura, Milpitas, CA (US);
Atsushi Iijima, Shatin (CN)

(73) Assignees: Headway Technologies, Inc., Milipitas, CA (US); SAE Magnetics (H.K.) Ltd., Hong Kong (CN)

( * ) Notice: Subject to any disclaimer, the term of this patent is extended or adjusted under 35 U.S.C. 154(b) by 310 days.

(21) Appl. No.: 12/662,138

(22) Filed: Mar. 31, 2010

(65) Prior Publication Data
US 2011/0242703 A1 Oct. 6, 2011

(51) Int. Cl.
*G11B 5/02* (2006.01)
*G11B 11/10* (2006.01)
*G11B 5/31* (2006.01)
(52) U.S. Cl. .......... 360/125.74; 360/125.31; 369/13.14; 369/13.17; 369/13.33
(58) Field of Classification Search ............... 369/13.13, 369/13.14, 13.17, 13.24, 13.33; 360/59, 360/125.31, 125.74
See application file for complete search history.

(56) References Cited

U.S. PATENT DOCUMENTS

| 2002/0167870 A1* | 11/2002 | Akiyama et al. | 369/13.33 |
| 2008/0151431 A1* | 6/2008 | Tanaka et al. | 360/245.3 |
| 2010/0315735 A1* | 12/2010 | Zhou et al. | 360/59 |
| 2012/0020194 A1* | 1/2012 | Jin et al. | 369/13.13 |

FOREIGN PATENT DOCUMENTS

| JP | A-2005-4901 | 1/2005 |
| JP | A-2007-164935 | 6/2007 |
| JP | A-2007-257753 | 10/2007 |
| JP | A-2008-257819 | 10/2008 |
| JP | A-2009-163806 | 7/2009 |
| JP | A-2009-187645 | 8/2009 |

* cited by examiner

*Primary Examiner* — Will J Klimowicz
(74) *Attorney, Agent, or Firm* — Oliff & Berridge, PLC

(57) ABSTRACT

A thermally assisted magnetic head includes a main magnetic pole layer, a near-field light generating layer having a generating end part generating near-field light arranged within a medium-opposing surface, and an optical waveguide guiding light to the near-field light generating layer. The thermally assisted magnetic head includes a base layer which a base groove part having a width gradually getting smaller along a depth direction and extending in an intersecting direction intersecting with the medium-opposing surface is formed. The near-field light generating layer has an in-groove generating layer formed inside of the base groove part. The in-groove generating layer is formed along an inner wall surface of the base groove part and has a thin-film like structure.

11 Claims, 24 Drawing Sheets

THERMALLY ASSISTED MAGNETIC HEAD, METHOD OF MANUFACTURING THE SAME, HEAD GIMBAL ASSEMBLY, AND HARD DISK DRIVE

BACKGROUND

1. Field of the Invention

The present invention relates to a thermally assisted magnetic head recording data on a magnetic recording medium by thermally assisted magnetic recording using near-field light and a method of manufacturing the same, and a head gimbal assembly and a hard disk drive each having a thermally assisted magnetic head.

2. Related Background Art

In recent years, as magnetic disk drives have been increasing their recording densities, thin-film magnetic heads recording data on a magnetic recording media have been required to further improve their performances. As the thin-film magnetic heads, those of composite type having a structure in which a reproducing head having a magnetoresistive device (hereinafter, referred to also as an "MR device") for read and a recording head having an electromagnetic coil device for write are laminated have been conventionally in wide use. In a magnetic disk drive, the thin-film magnetic head is provided on a slider which very slightly floats from the magnetic recording medium.

Incidentally, the magnetic disk drive records data by magnetizing magnetic fine particles on the magnetic recording medium using the recording head. In order to increase the recording density of the magnetic recording medium, it is effective to make the magnetic fine particles smaller.

When the magnetic fine particles are made smaller, however, there arises a problem that the magnetization thereof becomes unstable with respect to heat as the particles reduce in volume, thereby increasing the possibility that the data recorded on the magnetic recording medium is lost. To solve the problem, it is effective to increase the magnetic energy of the magnetic fine particles to thereby enhance the stability of magnetization. When the magnetic energy of the magnetic fine particles is increased, however, there arises another problem that the coercive force (difficulty in reversing magnetization) of the magnetic recording medium increases to deteriorate the data recording performance.

To solve such problems, a method called thermally assisted magnetic recording has been conventionally proposed. When recording data on a magnetic recording medium having a large coercive force, the thin-film magnetic head employing the thermally assisted magnetic recording (hereinafter, referred to as a "thermally assisted magnetic head") records data while instantaneously heating and thereby increasing the temperature of a portion of the magnetic recording medium where data will be recorded.

Since the magnetic fine particles decrease in coercive force when the temperature is increased, instantaneous heating makes it possible to record data even on the magnetic recording medium having a high coercive force at room temperature. The portion of the magnetic recording medium where the data has been recorded is decreased in temperature after the recording of data and thereby increases in coercive force. Therefore, by using the thermally assisted magnetic head, it becomes possible to make the magnetic fine particles finer as well as stabilize recording in the magnetic disk drive.

On the other hand, near-field light is used as means for heating the magnetic recording medium in the conventional thermally assisted magnetic head. When light enters an opening smaller than the wavelength of light, the light slightly seeps from the opening and locally exists near the opening. The light locally existing near the opening is called near-field light. The near-field light is confined in a region much smaller than that of a spot light obtained by collecting light using a lens, so that use of the near-field light makes it possible to heat only a limited extremely small recording region of the magnetic recording medium.

Known as a method of generating the near-field light in the conventional thermally assisted magnetic head is a method using a plasmon antenna (also called a plasmon probe) that is a minute metal piece. In this method, the near-field light is generated by guiding laser light to the plasmon antenna via an optical waveguide.

As a conventional plasmon antenna, a light scattering body made of metal such as gold, palladium or the like in a triangular thin plate structure is disclosed in Japanese Patent Application Laid-Open No. 2005-4901, for example. Further, a plasmon probe made of metal such as gold, silver, aluminum or the like in the shape of a triangle pole is disclosed in Japanese Patent Application Laid-Open No. 2007-257753. Furthermore, a near-field light generating part in an isosceles triangle including a tip end reaching a medium-opposing surface is disclosed in Japanese Patent Application Laid-Open No. 2007-164935.

SUMMARY OF THE INVENTION

As described above, in the conventional thermally assisted magnetic head, the laser light are guided to the plasmon antenna to excite surface plasmons to generate the near-field light based on the surface plasmons. This near-field light is used as means for heating the magnetic recording medium.

To increase the recording density in a magnetic recording apparatus, a smaller spot diameter of the near-field light is more preferable. To generate the near-field light having a small spot diameter and sufficient intensity, it is effective to concentrate more surface plasmons to the tip end portion of the plasmon antenna.

Further, to concentrate more surface plasmons, a technique of forming a plasmon antenna in the shape of a triangle pole has been known. In this case, the plasmon antenna is formed, for example, as shown in FIG. 23 to FIG. 26.

First, as shown in FIG. 23, photoresist is applied to the surface of a base layer 200 made of alumina or the like, and patterning using a predetermined photomask is performed to form a resist pattern 201. The resist pattern 201 is formed with an opening part 201a according to a V-shaped groove part 202 which will be formed afterward. Subsequently, reactive ion etching (hereinafter, referred also to as "RIE") is performed using the resist pattern 201 as a mask to remove a portion of the surface of the base layer 200 which is not covered with the resist pattern 201. Thus, the V-shaped groove part 202 is formed in the surface of the base layer 200 as shown in FIG. 24. The V-shaped groove part 202 is formed having a section in a V-shape in accordance with the shape of the plasmon antenna.

Subsequently, the resist pattern 201 is removed, and a metal thin film 203 made of gold, silver or the like is formed on the surface of the base layer 200 as shown in FIG. 25. The metal thin film 203 is formed on the whole surface of the base layer 200 and inside the V-shaped groove part 202. Then, for planarization of the surface, the metal thin film 203 is polished by chemical mechanical polishing (hereinafter, referred to as "CMP") until the surface of the base layer 200 is exposed. Thus, as shown in FIG. 26, a plasmon antenna 204 is formed inside the V-shaped groove part 202. The surface on the front side (outside) of the plasmon antenna 204 is a flat face. Further, the end face of the plasmon antenna 204 is formed in a reverse triangle with a width gradually getting smaller along the depth direction intersecting with the surface of the base layer 200.

The plasmon antenna 204, however, is formed by polishing the surface of the metal thin film 203 by the CMP, and thus has a surface which has been polished (a polished surface). The polished surface is apt to corrode due to adherence of impurities, dust and debris during the process of polishing. Then, the polished surface is arranged on the front side of the plasmon antenna 204, and other layers such as an optical waveguide and an interposed layer for generating evanescent light are junctioned to the polished surface. Therefore, the plasmon antenna 204 will take in laser light and evanescent light via the polished surface that is apt to corrode. Accordingly, when a portion of the surface is a polished surface like the plasmon antenna 204, a loss is apt to occur when laser light and evanescent light are taken into the plasmon antenna 204. This may weaken near-field light generated by the plasmon antenna 204.

The present invention is made to solve the above problems, and it is an object to provide a thermally assisted magnetic head having a structure that causes no loss due to corrosion of the surface of a near-field light generating layer such as a plasmon antenna or the like and is able to efficiently generate near-field light, and a method of manufacturing the same, and a head gimbal assembly and a hard disk drive each including the thermally assisted magnetic head.

To solve the above problems, the present invention is a thermally assisted magnetic head including a main magnetic pole layer having a magnetic pole end face arranged within a medium-opposing surface opposing a magnetic recording medium; a near-field light generating layer having a generating end part arranged within the medium-opposing surface, the generating end part generating near-field light for heating the magnetic recording medium; and an optical waveguide guiding light to the near-field light generating layer, the thermally assisted magnetic head including: a base layer which a base groove part having a width gradually getting smaller along a depth direction and extending in an intersecting direction intersecting with the medium-opposing surface is formed, wherein the near-field light generating layer has an in-groove generating layer formed inside of the base groove part in the base layer, wherein the in-groove generating layer is configured such that a portion arranged within the medium-opposing surface of a deepest part arranged at a deepest position constitutes the generating end part, and wherein the in-groove generating layer is formed along an inner wall surface of the base groove part and has a thin-film like structure in which an inner groove part, having the width gradually getting smaller along the depth direction, smaller in size than the base groove part is formed in the base groove part.

In the case of the thermally assisted magnetic head, the near-field light generating layer has a thin-film like structure allowing the inner groove part to be formed inside the base groove part and being able to be formed without embedding a metal member or the like made of the same material in the whole inside of the base groove part. The near-field light generating layer has a structure capable of being formed by performing a deposition of a metal by physical vapor deposition but unsuitable for being formed by the CMP.

It is possible that the above-described a thermally assisted magnetic head has an interposed layer in direct contact with the base groove part in the base layer, wherein the in-groove generating layer is formed on the interpose layer.

Further it is possible that the main magnetic pole layer has an in-groove magnetic pole layer formed inside the inner groove part and having a tapered shape according to the inner groove part, wherein the in-groove magnetic pole layer is configured such that a portion arranged within the medium-opposing surface constitutes the magnetic pole end face, and wherein the in-groove magnetic pole layer is formed in direct contact with an in-groove surface of the in-groove generating layer, and an end face arranged within the medium-opposing surface of an edge part with a smallest width is a front end part in direct contact with the generating end part.

Further it is possible that the near-field light generating layer further has an extended part connected to an upper end portion of the in-groove generating layer and formed in a strip-like shape along a front face of the base layer, and an in-groove surface fronting the inner groove part is a flat face.

Further it is possible that the main magnetic pole layer is composed of an in-groove magnetic pole layer formed inside the inner groove part and having a tapered shape according to the inner groove part, and an out-groove magnetic pole layer formed outside the inner groove part, in one united body, wherein the in-groove magnetic pole layer is configured such that a portion arranged within the medium-opposing surface constitutes the magnetic pole end face, wherein the in-groove magnetic pole layer is formed in direct contact with the in-groove surface of the in-groove generating layer, and an end face arranged within the medium-opposing surface of an edge part with a smallest width is a front end part in direct contact with the generating end part, and wherein the out-groove magnetic pole layer has a bulge-out part in contact with the extended part from a front side.

Further it is possible that the optical waveguide is in contact with a rear face of the base layer where the base groove part is not formed.

Further it is possible that the base groove part has a deep groove structure in which a valley bottom part arranged at a deepest position reaches a front face of the optical waveguide.

It is possible that both of the base groove part and the inner groove part are formed having sections in a V-shape.

It is possible that the magnetic pole end face of the main magnetic pole layer is formed in an isosceles triangle in which two sides connected to the front end part are equal in length.

Further, the present invention provides a method of manufacturing a thermally assisted magnetic head including a main magnetic pole layer having a magnetic pole end face arranged within a medium-opposing surface opposing a magnetic recording medium; a near-field light generating layer having a generating end part arranged within the medium-opposing surface, the generating end part generating near-field light for heating the magnetic recording medium; and an optical waveguide guiding light to the near-field light generating layer, including the following steps (1) to (3):

(1) a groove part forming step of forming a base layer on a surface of a laminated body, and then forming, in the base layer, a base groove part having a width gradually getting smaller along a depth direction of the base layer and extending in an intersecting direction intersecting with the medium-opposing surface;

(2) an interposed layer forming step of forming an interposed layer in direct contact with the base groove part by performing a deposition of a dielectric substance on an inner wall surface of the base groove part; and (3) a generating layer forming step of forming the near-field light generating layer by performing a deposition of a metal on an in-groove interposed layer of the interposed layer formed inside of the base groove part such that an inner groove part as a non-embedded region in which no metal is embedded is left inside the base groove part.

Further, it is preferable that in the generating layer forming step, the near-field light generating layer is formed to have an extended part in a strip-like shape along a front face of the base layer by performing the deposition of a metal on the in-groove interposed layer and a strip-like region of the interposed layer along the base groove part.

It is preferable that the above-described manufacturing method further includes the following step (4):

(4) a main magnetic pole layer forming step of forming the main magnetic pole layer by embedding a magnetic material into a whole inside of the inner groove part.

It is possible that the above-described manufacturing method further includes the following step (5):

(5) a main magnetic pole layer forming step of forming the main magnetic pole layer by embedding a magnetic material into a whole inside of the inner groove part and depositing the magnetic material on the extended part of the near-field light generating layer.

Further, it is possible that the above-described manufacturing method further includes an optical waveguide forming step of forming the optical waveguide before the base layer is formed, wherein after the optical waveguide is formed by performing the optical waveguide forming step, the base layer is formed on the optical waveguide.

Further, in the above-described manufacturing method, it is possible that in the groove part forming step, the base groove part is formed such that a valley bottom part arranged at a deepest position reaches a front face of the optical waveguide.

Further, in the above-described manufacturing method, it is possible that wherein in the groove part forming step, the base groove part is formed to have a section in a V-shape.

Further, in the above-described manufacturing method, it is possible that wherein in the generating layer forming step, the deposition of a metal is performed by physical vapor deposition.

Further, the present invention provides a head gimbal assembly including a slider formed a thermally assisted magnetic head, wherein the thermally assisted magnetic head including: a main magnetic pole layer having a magnetic pole end face arranged within a medium-opposing surface opposing a magnetic recording medium; a near-field light generating layer having a generating end part arranged within the medium-opposing surface, the generating end part generating near-field light for heating the magnetic recording medium; and an optical waveguide guiding light to the near-field light generating layer, a base layer which a base groove part having a width gradually getting smaller along a depth direction and extending in an intersecting direction intersecting with the medium-opposing surface is formed, wherein the near-field light generating layer has an in-groove generating layer formed inside of the base groove part in the base layer, wherein the in-groove generating layer is configured such that a portion arranged within the medium-opposing surface of a deepest part arranged at a deepest position constitutes the generating end part, and wherein the in-groove generating layer is formed along an inner wall surface of the base groove part and has a thin-film like structure in which an inner groove part, having the width gradually getting smaller along the depth direction, smaller in size than the base groove part is formed in the base groove part.

Further, the present invention provides a hard disk drive including a head gimbal assembly having a thermally assisted magnetic head, and a magnetic recording medium opposing the thermally assisted magnetic head, wherein the thermally assisted magnetic head including: a main magnetic pole layer having a magnetic pole end face arranged within a medium-opposing surface opposing a magnetic recording medium; a near-field light generating layer having a generating end part arranged within the medium-opposing surface, the generating end part generating near-field light for heating the magnetic recording medium; and an optical waveguide guiding light to the near-field light generating layer, a base layer which a base groove part having a width gradually getting smaller along a depth direction and extending in an intersecting direction intersecting with the medium-opposing surface is formed, wherein the near-field light generating layer has an in-groove generating layer formed inside of the base groove part in the base layer, wherein the in-groove generating layer is configured such that a portion arranged within the medium-opposing surface of a deepest part arranged at a deepest position constitutes the generating end part, and wherein the in-groove generating layer is formed along an inner wall surface of the base groove part and has a thin-film like structure in which an inner groove part, having the width gradually getting smaller along the depth direction, smaller in size than the base groove part is formed in the base groove part.

The present invention will be more fully understood from the detailed description given hereinbelow and the accompanying drawings which are given by way of illustration only, and thus are not to be considered as limiting the present invention.

DESCRIPTION OF THE PREFERRED EMBODIMENTS

In the following, embodiments of the present invention will be described with reference to the drawings. Note that the same components will be referred to with the same numerals or letters, while omitting their overlapping descriptions.

Structures of Thermally Assisted Magnetic Head

Figure 1:
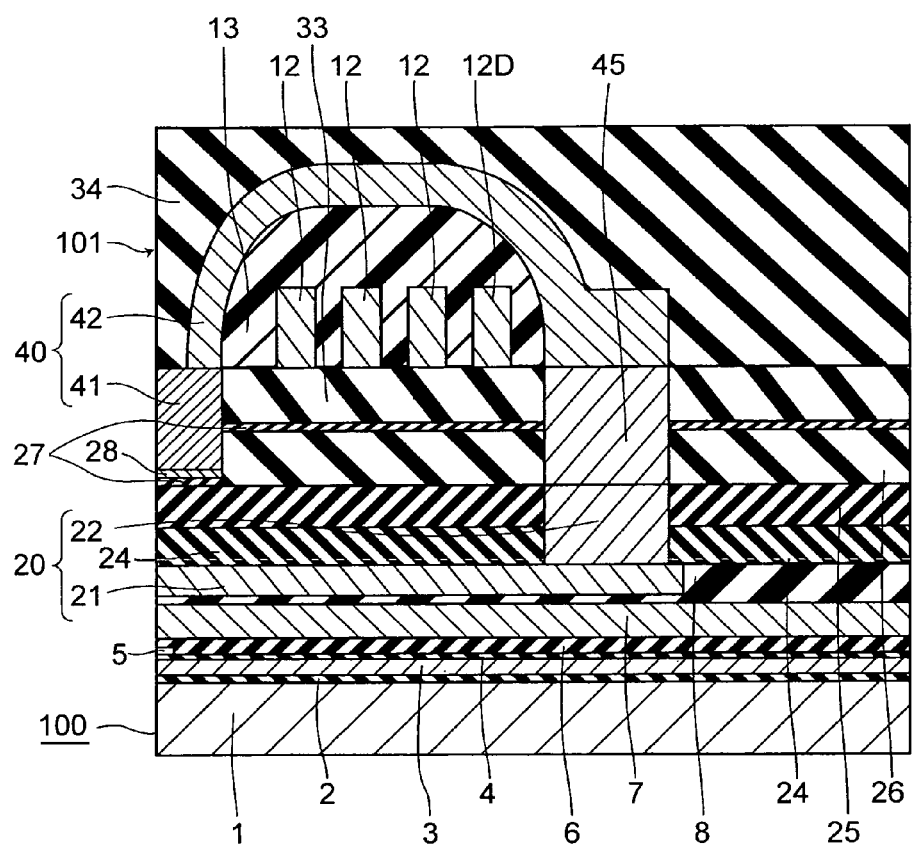
FIG. 1 is a sectional view of the thermally assisted magnetic head in accordance with an embodiment of the present invention taken along the line 1-1 of FIG. 3, which is a direction intersecting its ABS.
Figure 2:
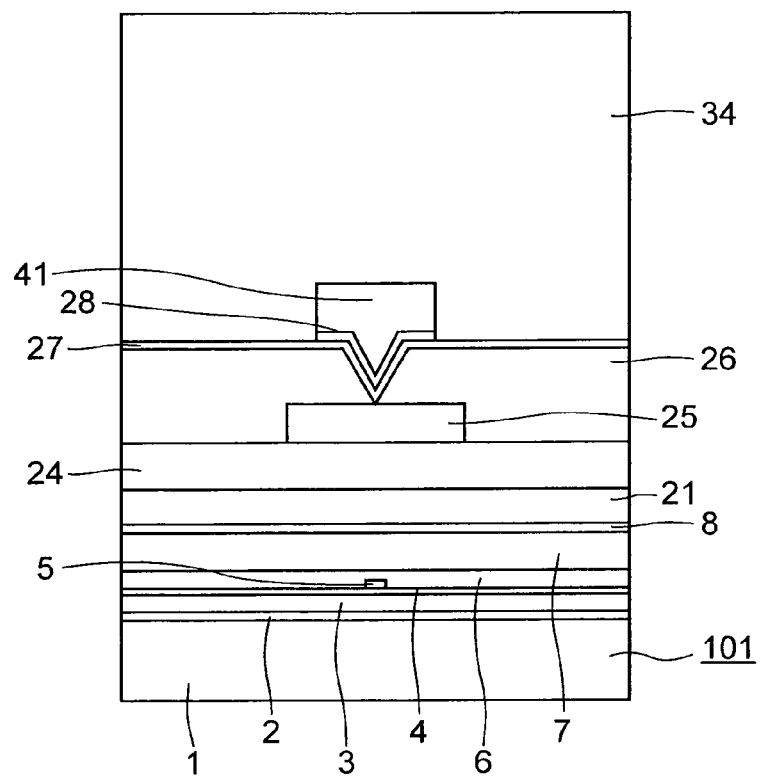
FIG. 2 is a front view illustrating the ABS of the thermally assisted magnetic head.
Figure 3:
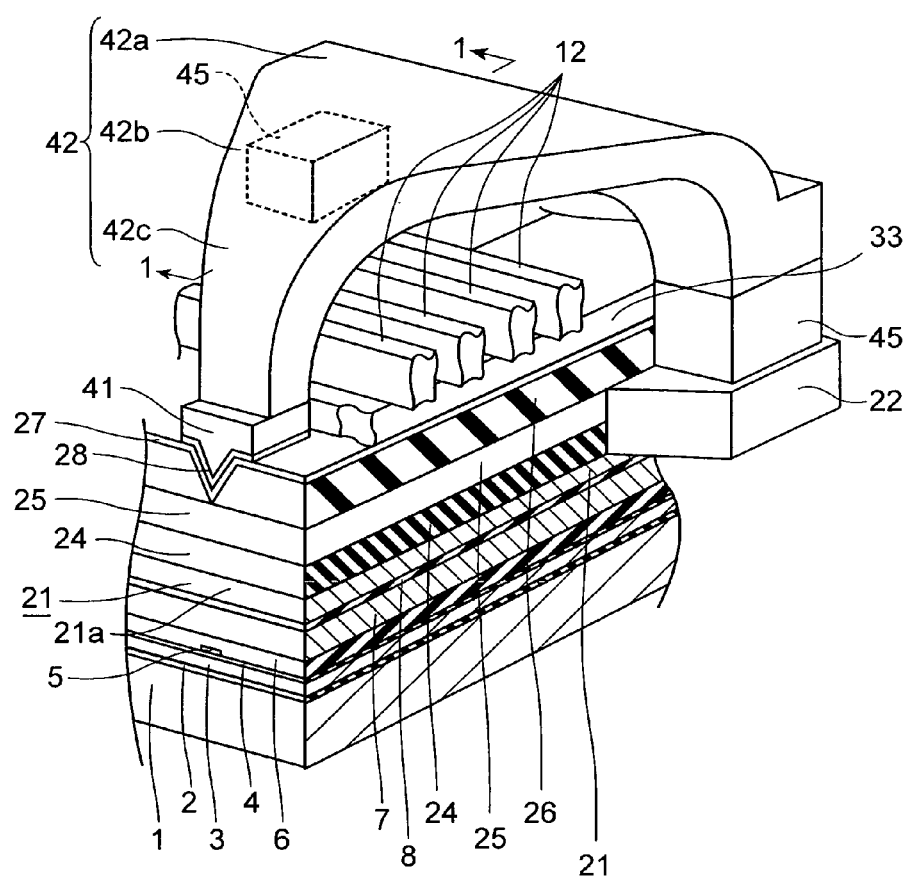
FIG. 3 is a perspective view illustrating an essential part of the thermally assisted magnetic head with a part thereof in section.
Figure 4:
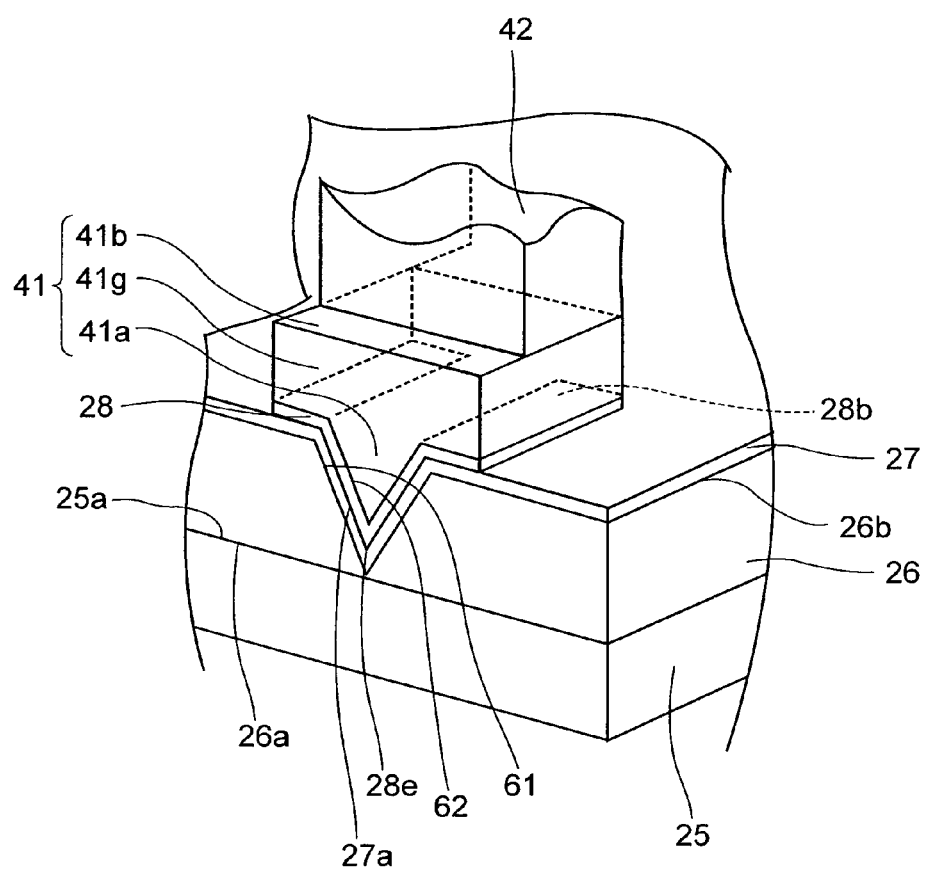
FIG. 4 is a perspective view illustrating an enlarged essential part of FIG. 3.
Figure 5:
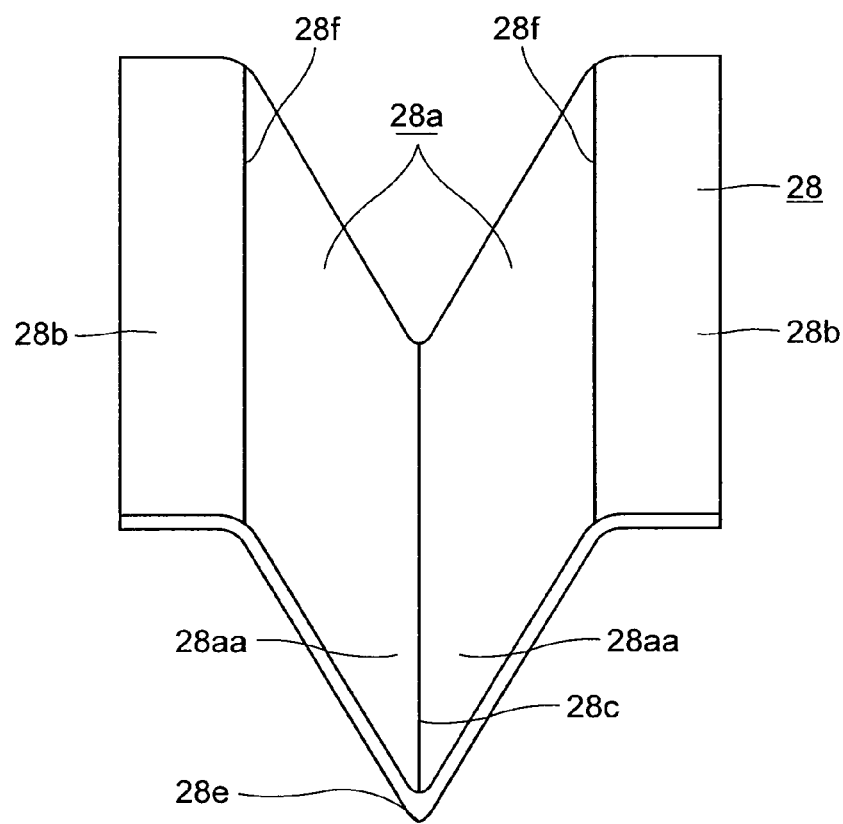
FIG. 5 is a perspective view illustrating a near-field light generating layer.
Figure 6:
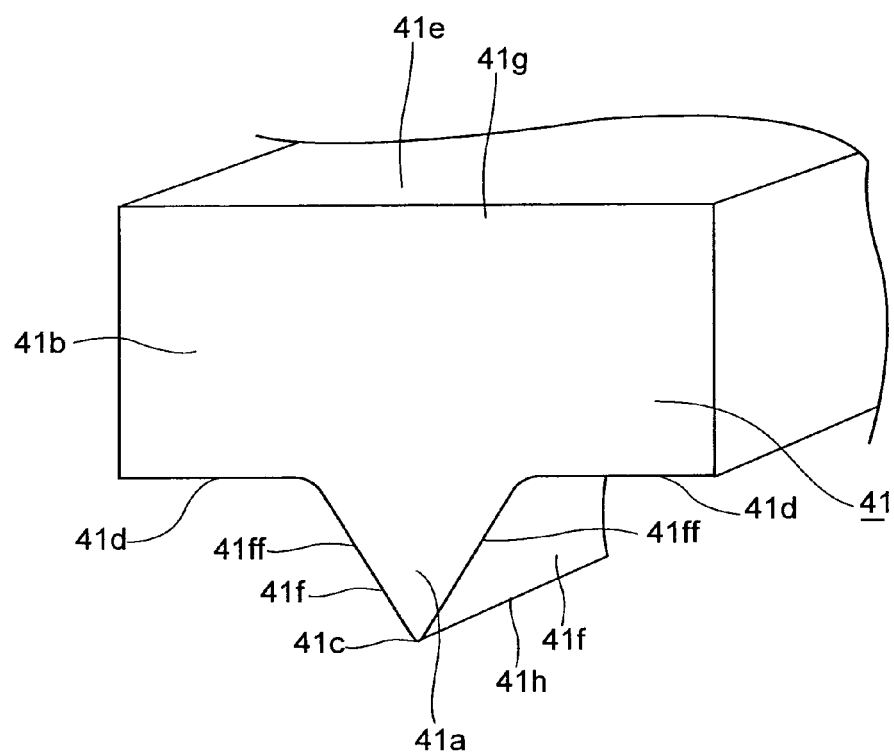
FIG. 6 is a perspective view, seen from the front, illustrating a magnetic pole end part layer with a part of the magnetic pole end part layer omitted.
Figure 7:
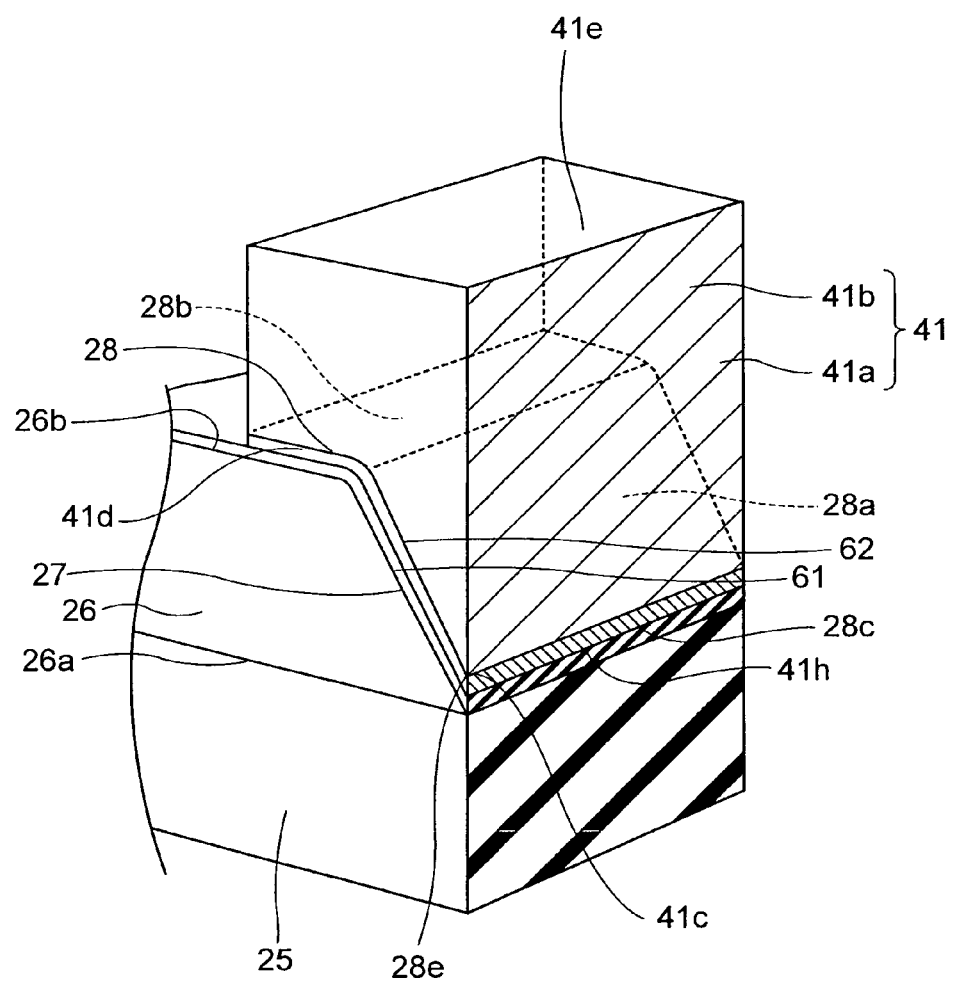
FIG. 7 is a sectional view illustrating an essential part of the thermally assisted magnetic head when the thermally assisted magnetic head is cut along a base groove part.

To begin with, the structure of a thermally assisted magnetic head will be described with reference to FIG. 1 to FIG. 7. Here, FIG. 1 is a sectional view of a thermally assisted magnetic head 100 in accordance with an embodiment of the present invention taken along the line 1-1 of FIG. 3 which is a direction intersecting with an air bearing surface (which will hereinafter be referred also to as "ABS"), while FIG. 2 is a front view illustrating an ABS 101 of the thermally assisted magnetic head 100. FIG. 3 is a perspective view illustrating an enlarged essential part of the thermally assisted magnetic head 100 with a part thereof illustrated in section, and FIG. 4 is a perspective view illustrating an enlarged essential part of FIG. 3. FIG. 5 is a perspective view illustrating a near-field light generating layer 28, and FIG. 6 is a perspective view, seen from the front, illustrating a magnetic pole end part layer 41 with a part of the magnetic pole end part layer 41 omitted, and FIG. 7 is a sectional view illustrating an essential part of the thermally assisted magnetic head 100 when the thermally assisted magnetic head 100 is cut along the base groove part. Note that the right and left direction (horizontal direction) in FIG. 2 is the track width direction, the upper direction is the moving direction of a magnetic recording medium, and the direction perpendicular to the paper surface is the direction perpendicular to the surface of the magnetic recording medium.

Thermally assisted magnetic head 100 comprises a substrate 1, reproducing head and recording head laminated on the substrate 1, while having the ABS 101 as a medium-opposing surface opposing a magnetic recording medium. The following will explain structures of main parts of the thermally assisted magnetic head 100, while structures of parts other than the main parts will later be explained in manufacturing processes.

The reproducing head has an MR device 5, arranged near the ABS 101, for detecting a magnetic signal. The reproducing head comprises a lower shield layer 3, a lower shield gap film 4, an upper shield gap film 6 and an upper shield layer 7.

An insulating layer 2 is further formed on the substrate 1, and the lower shield layer 3 made of a magnetic material is formed on the insulating layer 2. The lower shield gap film 4 as an insulating film is further formed on the lower shield layer 3, and the upper shield gap film 6 shielding the MR device 5 is formed on the lower shield gap film 4. The upper shield layer 7 made of a magnetic material is formed on the upper shield gap film 6, and an insulating layer 8 is formed on the upper shield layer 7.

The MR device 5 is constituted by a magnetosensitive film exhibiting a magnetoresistive effect, such as AMR (anisotropic magnetoresistive), GMR (giant magnetoresistive), and TMR (tunneling magnetoresistive) devices.

The GMR device may be of a CIP (Current In Plane) type or a CPP (Current Perpendicular to Plane) type. In the CIP type, current for detecting a magnetic signal flows in a direction almost parallel to planes of the layers constituting the GMR device. In the CPP type, current for detecting a magnetic signal flows in a direction almost perpendicular to planes of the layers constituting the GMR device.

Next, the recording head has a thin-film coil 12, a return magnetic pole layer 20, an optical waveguide 25, a base dielectric substance layer 26, an interposed layer 27, a near-field light generating layer 28, a main magnetic pole layer 40, and a linking magnetic pole layer 45, and has a structure in which they are stacked on the substrate 1.

The thin-film coil 12 has four turn parts. The thin-film coil 12 is wound like a flat spiral about a later-described yoke magnetic pole layer 42 of the main magnetic pole layer 40.

The four turn parts are arranged at respective positions having different distances from the ABS 101. Among them, the turn part 12D is a part arranged at a position most distant from the ABS 101 among the four turn parts of the thin-film coil 12, and has a structure as a most distant conductive part. The four turn parts are insulated from each other by a photoresist 13.

When a current modulated according to data to be recorded on the magnetic recording medium flows through the thin-film coil 12, the current causes the thin-film coil 12 to generate a recording magnetic field.

The return magnetic pole layer 20 has a connecting magnetic pole layer 21, and a rear magnetic pole layer 22. The connecting magnetic pole layer 21 has a magnetic pole end face 21a arranged within the ABS 101 (see FIG. 3) and has a portion that is more distant from the ABS 101 than is the magnetic pole end face 21a being embedded in the insulating layer 8. The connecting magnetic pole layer 21 has a size reaching a position more distant from the ABS 101 than is the turn part 12D. To the connecting magnetic pole layer 21, the rear magnetic pole layer 22 is junctioned at a position more distant from the ABS 101 than is the turn part 12D.

The rear magnetic pole layer 22 is arranged at a position more distant from the ABS 101 than is the turn part 12D, and is junctioned to the connecting magnetic pole layer 21 and the later-described linking magnetic pole layer 45.

The return magnetic pole layer 20 is provided to return a magnetic flux to the main magnetic pole layer 40. When a magnetic flux generated by the recording magnetic field is emitted from a later-described magnetic pole end face 41g of the main magnetic pole layer 40 to the magnetic recording medium, the magnetic flux flows back to the return magnetic pole layer 20 via the magnetic recording medium (a not-depicted soft magnetic layer in detail). This magnetic flux passes through the linking magnetic pole layer 45 and reaches the main magnetic pole layer 40.

Next, the optical waveguide 25 will be described. The optical waveguide 25 is arranged on the lower side (the side distant from the thin film coil 12, the side closer to the substrate 1) of the base dielectric substance layer 26. The optical waveguide 25 is in direct contact with a surface (referred also to as a rear face) 26a on the lower side (the side distant from the thin film coil 12 or the main magnetic pole layer 40) of the base dielectric substance layer 26 where a later-described base groove part 61 is not formed, as shown in FIG. 4. The optical waveguide 25 passes through (penetrates) the linking magnetic pole layer 45 to approach the ABS 101 from the rear side, and is formed in the intersecting direction, as illustrated in FIG. 3.

Figure 19:
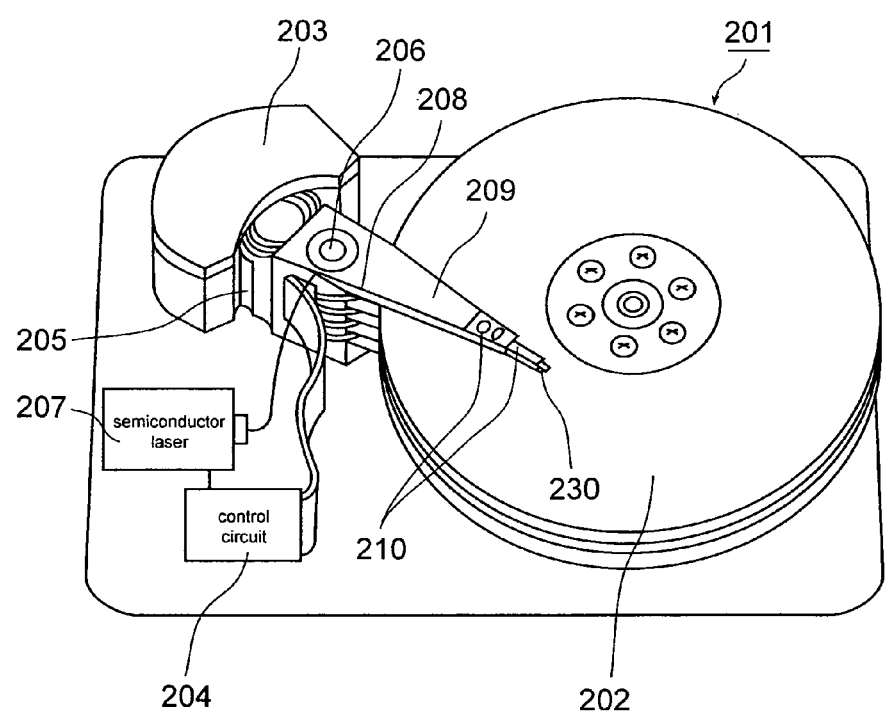
FIG. 19 is a perspective view illustrating a hard disk drive equipped with the thermally assisted magnetic head in FIG. 1.

To the optical waveguide 25, an optical fiber 208 not illustrated in FIG. 1 to FIG. 3 is connected. Laser light generated by a semiconductor laser 207 are inputted to the optical waveguide 25 via the optical fiber 208. The optical waveguide 25 is formed using a dielectric substance which transmits laser light, such as $Ta_2O_5$ or the like and has a thickness of about 0.4 μm to about 1.5 μm. Note that the semiconductor laser 207 and the optical fiber 208 are illustrated in FIG. 19 (both of them will be described later in detail).

The optical waveguide 25 has a width larger than the width of the magnetic pole end part layer 41 which will be described later. Further, the rear face 26a of the base dielectric substance layer 26 is in direct contact with a surface (referred also to as a front face) 25a on the upper side (the side of the thin film coil 12 or the main magnetic pole layer 40) of the optical waveguide 25.

The base dielectric substance layer 26 is formed in a substantially flat plate shape having a width larger than the width of the magnetic pole end part layer 41. The base dielectric substance layer 26 has the later-described base groove part 61 formed on a surface (a front face) 26b on the opposite side (the front side) to the rear face 26a. In the rear face 26a, a recess according to the optical waveguide 25 is formed, and the optical waveguide 25 fits in the recess (see FIG. 2 for details). The base dielectric substance layer 26 is in contact with the front face 25a and side faces on the right and left sides of the optical waveguide 25.

The base groove part 61 is formed, as shown in FIG. 4 (see FIG. 15 for details), in a tapered shape with a width gradually getting smaller as it approaches from the front face 26b along the depth direction (the direction orthogonal to the front face 26b). The base groove part 61 extends in the intersecting direction and has a length corresponding to the distance in the intersecting direction of the magnetic pole end part layer 41 (the distance in the intersecting direction is referred also to as a "backward length").

Figure 15:
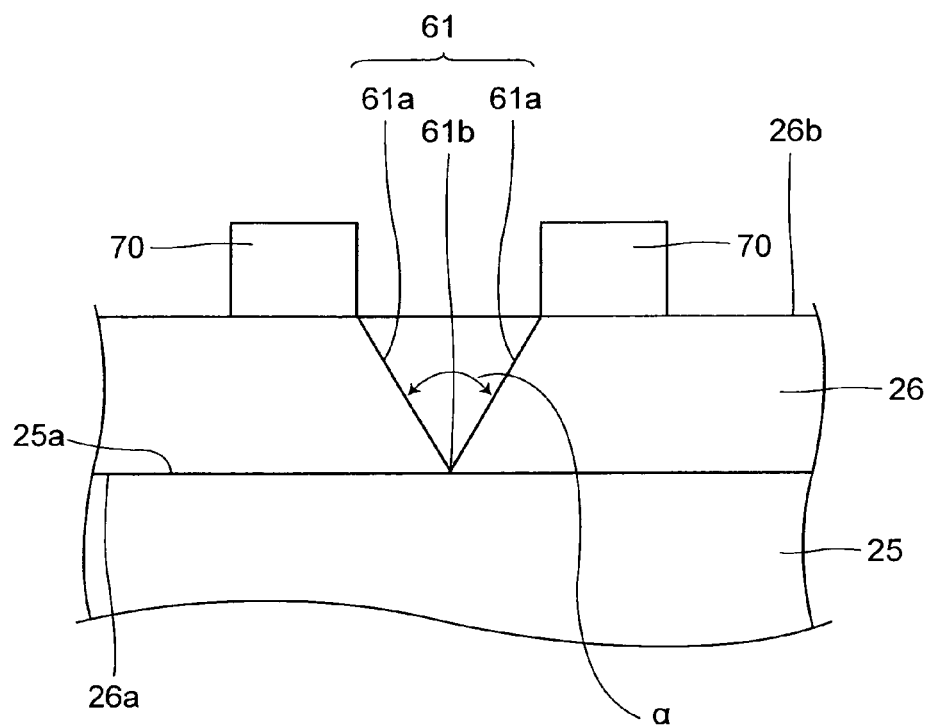
FIG. 15 is a front view, seen from the ABS, illustrating a base dielectric substance layer and an optical waveguide after forming of a base groove part.

More specifically, a portion having a section in a V-shape surrounded by two inclined wall surfaces 61a and 61a and a valley bottom part 61b is the base groove part 61 as shown in FIG. 15. The distance between one of the inclined wall surfaces 61a and the other inclined wall surface 61a gradually gets smaller as it becomes more distant from the front face 26b along the depth direction of the base groove part 61. In addition, the one inclined wall surface 61a and the other inclined wall surface 61a are coupled to each other at a position closest to the optical waveguide 25. A portion where the one inclined wall surface 61a and the other inclined wall surface 61a are coupled is the valley bottom part 61b. In the thermally assisted magnetic head 100, though an angle formed by the two inclined wall surfaces 61a and 61a (a base included angle, an angle α in FIG. 15) is able to be set to be an obtuse angle larger than 90 degrees at the valley bottom part 61b, the base included angle is preferably set to be an acute angle as shown in FIG. 15.

The valley bottom part 61b is arranged at a deepest position of the base groove part 61 and reaches the front face 25a of the optical waveguide 25. The base dielectric substance layer 26 has a structure (a deep groove structure) having a deep groove in which the valley bottom part 61b has a depth reaching the front face 25a of the optical waveguide 25 directly under the valley bottom part 61b. The base dielectric substance layer 26 is formed using a dielectric substance such as alumina or the like.

Figure 16:
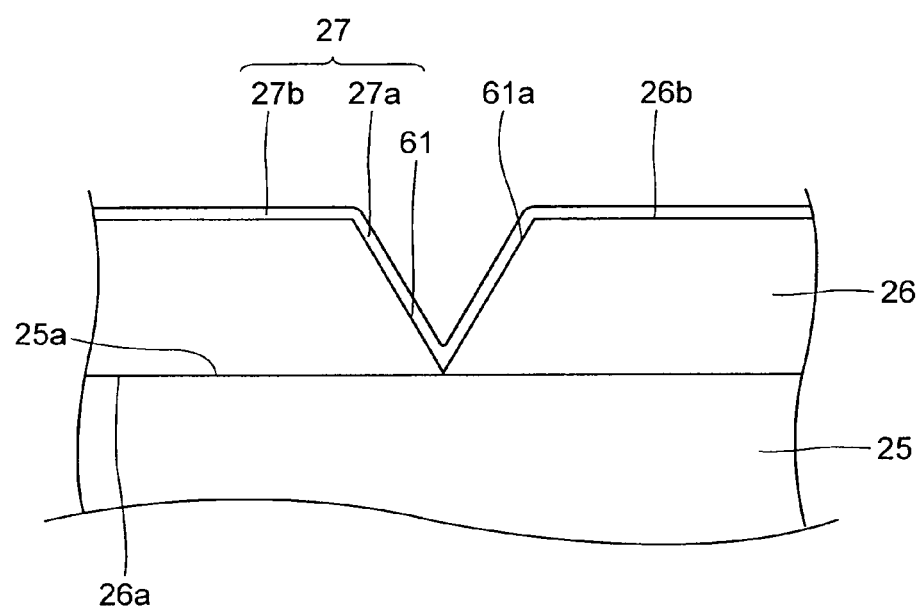
FIG. 16 is a front view, seen from the ABS, illustrating a base dielectric substance layer and an optical waveguide after forming of an interposed layer.

The interposed layer 27 is in direct contact with the front face 26b of the base dielectric substance layer 26 and the inclined wall surfaces 61a and 61a of the base groove part 61 as shown in FIG. 4 and FIG. 16. Portions of the interposed layer 27 formed inside the base groove part 61 are in-groove interposed layers 27a (see FIG. 16) which will be described later.

The interposed layer 27 electrically separates the near-field light generating layer 28 and the main magnetic pole layer 40 from the base dielectric substance layer 26 and the optical waveguide 25. The interposed layer 27 is formed using a dielectric substance having a lower refractive index than that of the optical waveguide 25, and for example, using alumina. The interposed layer 27 has a thickness of, for example, about 10 nm to about 70 nm, which is much smaller than those of the main magnetic pole layer 40 and the optical waveguide 25, and is thus referred also to as a very-thin interposed layer.

The near-field light generating layer 28 has two in-groove generating layers 28a and 28a and two extended parts 28b and 28b as shown in detail in FIG. 5, and is constituted of them connected in one body. In the near-field light generating layer 28, one of the in-groove generating layers 28a and the other in-groove generating layer 28a are connected with each other via a valley bottom part 28c, and the extended parts 28b are connected to respective sides of the in-groove generating layers 28a via folded parts 28f. The two in-groove generating layers 28a and 28a and the valley bottom part 28c have a structure folded in a V-shape as a whole when seen from the ABS 101. The near-field light generating layer 28 has a form made by folding a middle portion of a plate material in a band shape into a sharp V-shape and folding outward strip-like portions with a small width from both ends. The formed portion corresponding to the former folding is the valley bottom part 28c, and the formed portions corresponding to the latter folding are the folded parts 28f and 28f. The valley bottom part 28c is folded also at an acute angle, and thus has a function as a folded part.

The near-field light generating layer 28 has a thin-film like structure with a very small thickness to allow a later-described inner groove part 62 to be formed inside the base groove part 61. The thickness of the near-field light generating layer 28 is smaller than the depth of the base groove part 61. Further, in the in-groove generating layers 28a and 28a, in-groove surfaces 28aa and 28aa which front the inner groove part 62 and determine the outer shape of the inner groove part 62 are flat surfaces (flat faces).

The near-field light generating layer 28 is made of metal and formed of, for example, one of Au, Ag, Al, Cu, Pd, Pt, Rh, Ir or an alloy made of a plurality of those elements.

Both of the in-groove generating layers 28a and 28a are formed inside the base groove part 61. The in-groove generating layers 28a and 28a are formed directly on the in-groove interposed layers 27a along the inclined wall surfaces 61a and 61a of the base groove part 61 respectively (see FIG. 16 and FIG. 17). The in-groove generating layers 28a and 28a are formed in rectangular plate shapes according to the inclined wall surfaces 61a and 61a.

The distance between one of the in-groove generating layers 28a and the other in-groove generating layer 28a gradually gets smaller as it becomes more distant from the extended parts 28b and 28b along the depth direction of the base groove part 61. In addition, the one in-groove generating layer 28a and the other in-groove generating layer 28a are coupled to each other at a position closest to the optical waveguide 25. A portion where the one in-groove generating layer 28a and the other in-groove generating layer 28a are coupled is the valley bottom part 28c.

Thus, the two in-groove generating layers 28a and 28a and the valley bottom part 28c form a gap having a section in a V-shape inside the base groove part 61. The gap having the section in a V-shape is the inner groove part 62 (see FIG. 4 and FIG. 17). The angle formed by the two in-groove generating layers 28a and 28a at the valley bottom part 28c (referred also to as a generating layer included angle, an angle β in FIG. 17) is able to be set to an angle that is equal to the above-described base included angle of the base groove part 61 by equalizing the thicknesses of the two in-groove generating layers 28a and 28a.

The inner groove part 62 is formed inside the base groove part 61. The inner groove part 62 is smaller in size than the base groove part 61, but is formed to have a section in a V-shape similar to that of the base groove part 61. The size of the inner groove part 62 is smaller than the size of the base groove part 61 by the film thicknesses of the in-groove interposed layers 27a and the in-groove generating layers 28a. The inner groove part 62 is a portion that is left, as a non-embedded region in which no metal is embedded, inside the base groove part 61 in a later-described generating layer forming process for forming the near-field light generating layer 28 (described later for details).

The valley bottom part 28c is, as shown in FIG. 5, a portion arranged at the deepest positions of the in-groove generating layers 28a and 28a, that is, a deepest part. The valley bottom part 28c extends from the ABS 101 in the intersecting direction. The end face of the valley bottom part 28c on the ABS 101 side is arranged within the ABS 101. This end face is a generating end part 28e. The generating end part 28e generates near-field light for heating the magnetic recording medium which will be described later for details.

The extended parts 28b and 28b are connected to upper end portions of the in-groove generating layers 28a and 28a. The extended parts 28b and 28b are formed directly on later-described strip-like regions 27b of the interposed layer 27 along the front face 26b of the base dielectric substance layer 26. The extended parts 28b and 28b are strip-like portions extending from the upper end portions of the in-groove generating layers 28a and 28a toward the outside of the base groove part 61.

Next, the main magnetic pole layer 40 will be described. The main magnetic pole layer 40 has the magnetic pole end part layer 41 and the yoke magnetic pole layer 42. The magnetic pole end part layer 41 and the yoke magnetic pole layer 42 have a symmetrical structure formed to be bilaterally symmetrical about a later-described front end part 41c. The magnetic pole end part layer 41 has an in-groove magnetic pole layer 41a and an out-groove magnetic pole layer 41b. In the main magnetic pole layer 40, the out-groove magnetic pole layer 41b overlaps on the in-groove magnetic pole layer 41a. The main magnetic pole layer 40 has a structure in which the out-groove magnetic pole layer 41b is united with the in-groove magnetic pole layer 41a.

The in-groove magnetic pole layer 41a is formed inside the inner groove part 62 as shown in FIG. 4. The in-groove magnetic pole layer 41a is embedded in the whole inner groove part 62 without any space therebetween. The in-groove magnetic pole layer 41a is surrounded by the in-groove generating layers 28a and 28a on both sides in the width direction. The in-groove magnetic pole layer 41a has a size according to the inner groove part 62, and has a tapered shape with a width gradually getting smaller according to the inner groove part 62. The in-groove magnetic pole layer 41a has two inclined wall surfaces 41f and 41f and an edge part 41h. The whole in-groove magnetic pole layer 41a is made of a magnetic material such as CoNiFe, CoFe, NiFe, CoFeN or the like. The in-groove magnetic pole layer 41a is formed in a downward triangle shape in which the sharp edge part 41h faces the side of the optical waveguide 25.

The inclined wall surfaces 41f and 41f are in direct contact with the in-groove generating layers 28a and 28a. Further, the distance between one of the inclined wall surfaces 41f and the other inclined wall surface 41f gradually gets smaller as it becomes more distant from the out-groove magnetic pole layer 41b. In addition, the one inclined wall surface 41f and the other inclined wall surface 41f are coupled to each other at a position closest to the optical waveguide 25. A portion where the one inclined wall surface 41f and the other inclined wall surface 41f are coupled is the edge part 41h.

The edge part 41h has a shape like an edge of a cutting tool. The edge part 41h is a portion with a smallest width in the in-groove magnetic pole layer 41a and a portion near the portion with the smallest width. The edge part 41h is arranged at a position closest to the optical waveguide 25 in the in-groove magnetic pole layer 41a. The edge part 41h extends in the intersecting direction. The edge part 41h has a backward length equal to the backward length of the near-field light generating layer 28.

In addition, the end face of the edge part 41h on the ABS 101 side is arranged within the ABS 101. This end face is the front end part 41c. The front face including the front end part 41c constitutes the magnetic pole end face 41g. The magnetic pole end face 41g is arranged within the ABS 101. A portion of the magnetic pole end face 41g arranged in the inner groove part 62 is formed in an isosceles triangle in which two sides 41ff connected to the front end part 41c are equal in length. The front end part 41c is in direct contact with the generating end part 28e of the near-field light generating layer 28 from the front side.

The out-groove magnetic pole layer 41b is formed outside the inner groove part 62. The out-groove magnetic pole layer 41b has a width larger than the width of the in-groove magnetic pole layer 41a. The out-groove magnetic pole layer 41b has a lateral width according to the distance from one of the extended parts 28b to the other extended part 28b of the near-field light generating layer 28, and a backward length equal to that of the near-field light generating layer 28.

The out-groove magnetic pole layer 41b is formed in a rectangle parallelepiped shape. To the front face 41e (see FIG. 6) of the out-groove magnetic pole layer 41b, the yoke magnetic pole layer 42 is junctioned. Further, bulge-out parts 41d and 41d are formed on both sides in the width direction. The bulge-out parts 41d and 41d are portions of the out-groove magnetic pole layer 41b which bulge outside of the inner groove part 62. The bulge-out parts 41d and 41d are formed in strip-like shapes similar to those of the extended parts 28b and 28b of the near-field light generating layer 28. The bulge-out parts 41d and 41d are in direct contact with the extended parts 28b and 28b.

The yoke magnetic pole layer 42 has a rear magnetic pole layer 42a, a middle magnetic pole layer 42b, and a front magnetic pole layer 42c particularly illustrated in FIG. 3. The yoke magnetic pole layer 42 has a curved structure extending from the ABS 101 in the intersecting direction and leading to the linking magnetic pole layer 45 straddling the thin-film coil 12.

The rear magnetic pole layer 42a is arranged at a position more distant from the ABS 101 than are the four turn parts of the thin-film coil 12. The rear magnetic pole layer 42a has a lateral width larger than that of the middle magnetic pole layer 42b (the largest lateral width in the yoke magnetic pole layer 42) and is junctioned to the linking magnetic pole layer 45. The middle magnetic pole layer 42b is arranged above the thin-film coil 12. The middle magnetic pole layer 42b is connected to the rear magnetic pole layer 42a and the front magnetic pole layer 42c. The middle magnetic pole layer 42b has a lateral width gradually getting smaller as it approaches to the ABS 101. The front magnetic pole layer 42c is formed in a downward curved structure getting closer to the magnetic pole end part layer 41 as it approaches to the ABS 101. The front magnetic pole layer 42c is junctioned to the front face 41e of the magnetic pole end part layer 41.

Next, the linking magnetic pole layer 45 will be described. The linking magnetic pole layer 45 is arranged in a manner to hold the optical waveguide 25 from both right and left sides at a position more distant from the ABS 101 than is the thin-film coil 12. Further, the linking magnetic pole layer 45 is junctioned to the rear magnetic pole layer 22. The linking magnetic pole layer 45 magnetically links the return magnetic pole layer 20 to the main magnetic pole layer 40, and has a role of returning, to the main magnetic pole layer 40, the magnetic flux flown back to the return magnetic pole layer 20.

Operation Contents of Thermally Assisted Magnetic Head

Subsequently, the magnetic recording operation of the thermally assisted magnetic head having the above structure will be described as follows.

When a current modulated according to data to be recorded on the magnetic recording medium is caused to flow through the thin-film coil 12, the thin-film coil 12 generate a recording magnetic field by the current. The recording magnetic field passes through the main magnetic pole layer 40, and a magnetic flux caused by the recording magnetic field is emitted from the magnetic pole end face 41g to the magnetic recording medium. With this magnetic flux, the data is recorded on the magnetic recording medium.

On the other hand, when the semiconductor laser 207 generates laser light, the laser light are transmitted to the optical waveguide 25 via the optical fiber 208. The laser light move through the optical waveguide 25 to the ABS 101. Since the near-field light generating layer 28 is arranged on the ABS 101 side of the optical waveguide 25 via the interposed layer 27, the laser light moved through the optical waveguide 25 to close to the ABS 101 are applied to the near-field light generating layer 28 via the interposed layer 27.

On the other hand, the base dielectric substance layer 26 is in direct contact with the front face 25a of the optical waveguide 25, and the in-groove generating layers 28a and 28a of the near-field light generating layer 28 are formed inside the base groove part 61 of the base dielectric substance layer 26. The base groove part 61 has the above-described deep groove structure, and therefore the deepest valley bottom part 61b has a depth reaching the front face 25a of the optical waveguide 25. Therefore, the near-field light generating layer 28 is formed on the front face 26b of the base dielectric substance layer 26 which is most distant from the optical waveguide 25, while only the portion of the valley bottom part 28c is opposed to the optical waveguide 25 via only the very thin interposed layer 27. Accordingly, the near-field light generating layer 28 (more specifically, the valley bottom part 28c) is arranged very close to the optical waveguide 25 in the thermally assisted magnetic head 100. Accordingly, the loss when the laser light is applied from the optical waveguide 25 to the near-field light generating layer 28 is very small, so that the laser light is very efficiently applied to the near-field light generating layer 28.

Further, when laser light enter the interposed layer 27 having a lower refractive index than that of optical waveguide 25 from the optical waveguide 25 and are totally reflected, evanescent light seeps near the surface of the interposed layer 27 having a lower refractive index. The use of the evanescent light makes it possible to match the phase speed thereof with the phase speed of surface plasmons and excite surface plasmons at the near-field light generating layer 28.

The surface plasmons propagate to the generating end part 28e arranged on the ABS 101 side of the near-field light generating layer 28. Here, the near-field light generating layer 28 is folded in a V-shape as a whole seen from the ABS 101 in which a tip portion having the smallest width of the folded portion is the valley bottom part 28c, and the generating end part 28e is the end face of the valley bottom part 28c on the ABS 101 side. Therefore, the surface plasmons are concentrated on the generating end part 28e. Then, a near-field light having a very high electric field intensity is generated near the generating end part 28e.

The near-field light is applied from the generating end part 28e to the magnetic recording medium and reaches the surface of the magnetic recording medium. Then, a limited extremely small region in the magnetic recording layer of the magnetic recording medium is intensively heated by the near-field light. In the magnetic recording layer, the coercive force reduces to an extent at which data can be recorded by the magnetic flux caused by the recording magnetic field.

In the thermally assisted magnetic head 100, the coercive force is able to be reduced in the above-described manner, so that data can be recorded also on a magnetic recording medium having a high coercive force for high-density recording.

Incidentally, the near-field light generating layer 28 has the in-groove generating layers 28a and 28a in the thermally assisted magnetic head 100. The in-groove generating layers 28a and 28a are formed along the inclined wall surfaces 61a of the base groove part 61, and have a thin-film like structure allowing the inner groove part 62 to be formed inside the base groove part 61.

The near-field light generating layer 28 is mainly composed of such in-groove generating layers 28a and 28a, and therefore has a structure that is able to be formed by performing formation of a metal film on the in-groove interposed layers 27a by physical vapor deposition such as sputtering, vacuum deposition or the like though details will be described later. The near-field light generating layer 28 has a structure in which polishing by the CMP performed on the front face for planarization is unnecessary. The CMP is suitable for forming a metal film on the front face of the base dielectric substance layer 26, and then embedding the metal inside the whole base groove part 61 without any space. The CMP is suitable for embedding a metal member or the like made of the same material in the whole inside of the base groove part 61 without any space. However, inside the base groove part 61, in addition to the near-field light generating layer 28, the in-groove magnetic pole layer 41a made of a material different from the material of the near-field light generating layer 28 is formed. The CMP cannot planarize the surface of the metal thin film such as the near-field light generating layer 28 that enter the base groove part 61 and is able to form the gap such as the inner groove part 62. The in-groove surface 28aa of the in-groove generating layer 28a is a flat face, but the planarization of the in-groove surface 28aa is not able to be performed by the CMP. Further, since the extended parts 28b and 28b of the near-field light generating layer 28 are formed outside the base groove part 61, the extended parts 28b may be removed when the surface of the base dielectric substance layer 26 is polished by the CMP. The near-field light generating layer 28 has a structure that is not suitable for being formed by the CMP.

Further, the near-field light generating layer 28 has a structure in which the two in-groove generating layers 28a and 28a and the two extended parts 28b and 28b are connected in one body via the folded parts 28f and 28f and the valley bottom part 28c as if it were formed by folding a band-shape plate. Such a structure is not able to be formed by the CMP suitable for embedding into the whole inside of the groove part. The CMP is a method that is incompatible with the structure like the near-field light generating layer 28. The near-field light generating layer 28 does not have a polished surface made by the CMP at all, but the whole surface of the near-field light generating layer 28 is an unpolished surface (referred also to as a non-polished surface).

Therefore, for the near-field light generating layer 28, no laser light nor evanescent light is taken thereinto through the polished surface made by the CMP. Accordingly, in the near-field light generating layer 28, there is no possibility of occurrence of a loss accompanying corrosion of the surface when the laser light or the evanescent light is taken in. Thus, the thermally assisted magnetic head 100 is able to very efficiently generate near-field light by the near-field light generating layer 28.

Further, the in-groove generating layers 28a and 28a of the near-field light generating layer 28 are formed on the surface of the in-groove interposed layers 27a. Therefore, the valley bottom part 28c of the near-field light generating layer 28 is opposed to the front face 25a of the optical waveguide 25 separated by the distance according to the thickness of the in-groove interposed layer 27a. Thus, the evanescent light generated by total reflection of the laser light propagating through the optical waveguide 25 is able to be used to excite surface plasmons at the near-field light generating layer 28.

On the other hand, a structure having a flat face is preferable for tightly conjunctioning to another member such as the optical waveguide. Since the in-groove surfaces 28aa and 28aa fronting the inner groove part 62 of the in-groove generating layers 28a and 28a are flat faces, the in-groove magnetic pole layer 41a is in tight contact with the in-groove generating layers 28a and 28a.

Further, in the thermally assisted magnetic head 100, the near-field light generating layer 28 forms the inner groove part 62 composed of the in-groove generating layers 28a and 28a inside the base groove part 61, the in-groove magnetic pole layer 41a of the main magnetic pole layer 40 is arranged in the inner groove part 62, and the in-groove magnetic pole layer 41a is embedded in the inner groove part 62 without any space therebetween. The in-groove magnetic pole layer 41a is formed in direct contact with the in-groove surfaces 28aa and has a tapered shape according to the inner groove part 62, and the front end part 41c of the edge part 41h with the smallest width is in direct contact with the generating end part 28e.

In the thermally assisted magnetic head 100, the near-field light generating layer 28 and the main magnetic pole layer 40 are arranged as mentioned above, by this, the front end part 41c is arranged at very close positions boundlessly close to the generating end part 28e generating the intensive near-field light. Therefore, a magnetic flux is able to be emitted from the front end part 41c of the magnetic pole end face 41g to a limited extremely small region (this region is a recording region where data will be recorded) in the magnetic recording medium to which the near-field light is applied from the generating end part 28e, so as to record data on the recording region. Thus, in the thermally assisted magnetic head 100, recording of data and heating are able to be highly efficiently performed on the extremely small recording region of the magnetic recording medium.

In the thermally assisted magnetic head 100, the three elements of the near-field light generating layer 28, the main magnetic pole layer 40, and the optical waveguide 25 are arranged in a most efficient positional relation for performing recording data and heating on the extremely small recording region of the magnetic recording medium.

Further, in the near-field light generating layer 28, the extended parts 28b and 28b are connected to the upper end portions of the two in-groove generating layers 28a and 28a respectively. Therefore, the surface area of the near-field light generating layer 28 is increased owing to the presence of the extended parts 28b and 28b. Accordingly, the near-field light generating layer 28 is able to take in the evanescent light also through the extended parts 28b and 28b, and generates near-field light having an accordingly high electric field intensity.

Further, the bulge-out parts 41d and 41d of the main magnetic pole layer 40 are in direct contact with the two extended parts 28b and 28b. Therefore, a part of the laser light travelling through the optical waveguide 25 is able to be reflected by the bulge-out parts 41d and 41d and guided to the extended parts 28b and 28b. Then, near-field light having higher intensity is able to be generated by the near-field light generating layer 28.

Further, since the near-field light generating layer 28 is arranged to be able to take in the light through the two in-groove generating layers 28a, 28a into the near-field light generating layer 28, the near-field light generating layer 28 is able to efficiently take in evanescent light through the two in-groove generating layers 28a, 28a and efficiently generate surface plasmons.

On the other hand, the portion of the magnetic pole end face 41g arranged in the inner groove part 62 is formed in an isosceles triangle in which the two sides 41f connected to the front end part 41c are equal in length. Therefore, a magnetic flux is able to be intensively emitted from the magnetic pole end face 41g to the limited extremely small region of the magnetic recording medium where data will be recorded. In addition, the recording region is able to be intensively and surely heated by the near-field light generated from the generating end part 28e.

Method of Manufacturing Thermally Assisted Magnetic Head

Figure 8:
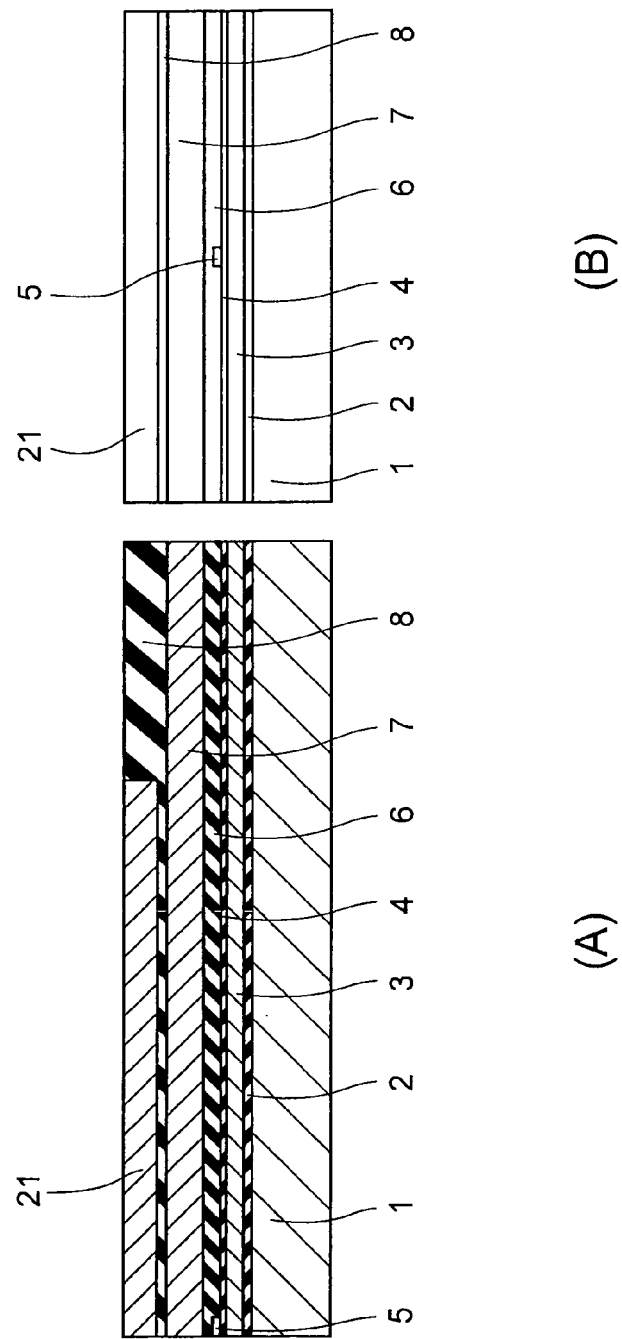
FIG. 8 is a sectional view illustrating a process of manufacturing the thermally assisted magnetic head in accordance with an embodiment of the present invention, in which (A) is a sectional view corresponding to FIG. 1, (B) is a sectional view corresponding to FIG. 2.
Figure 9:
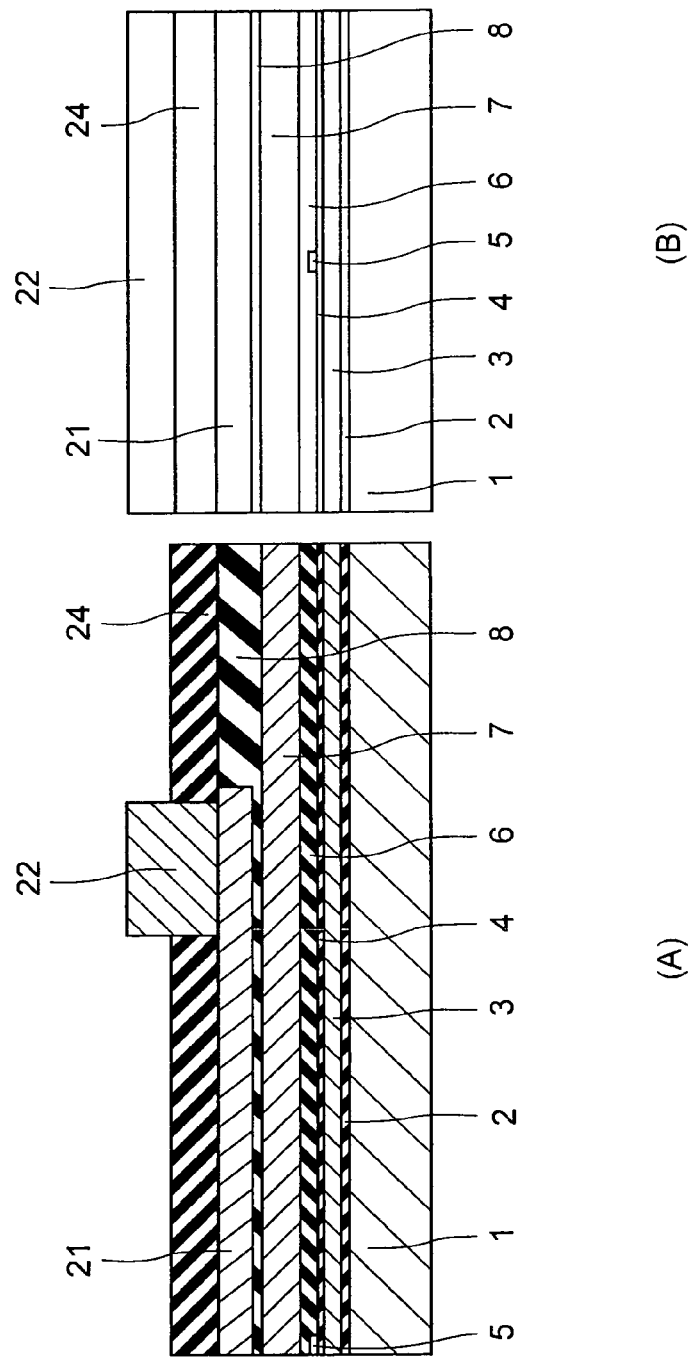
FIG. 9 is a sectional view illustrating a process subsequent to that in FIG. 8, in which (A) is a sectional view corresponding to FIG. 1, (B) is a sectional view corresponding to FIG. 2.
Figure 10:
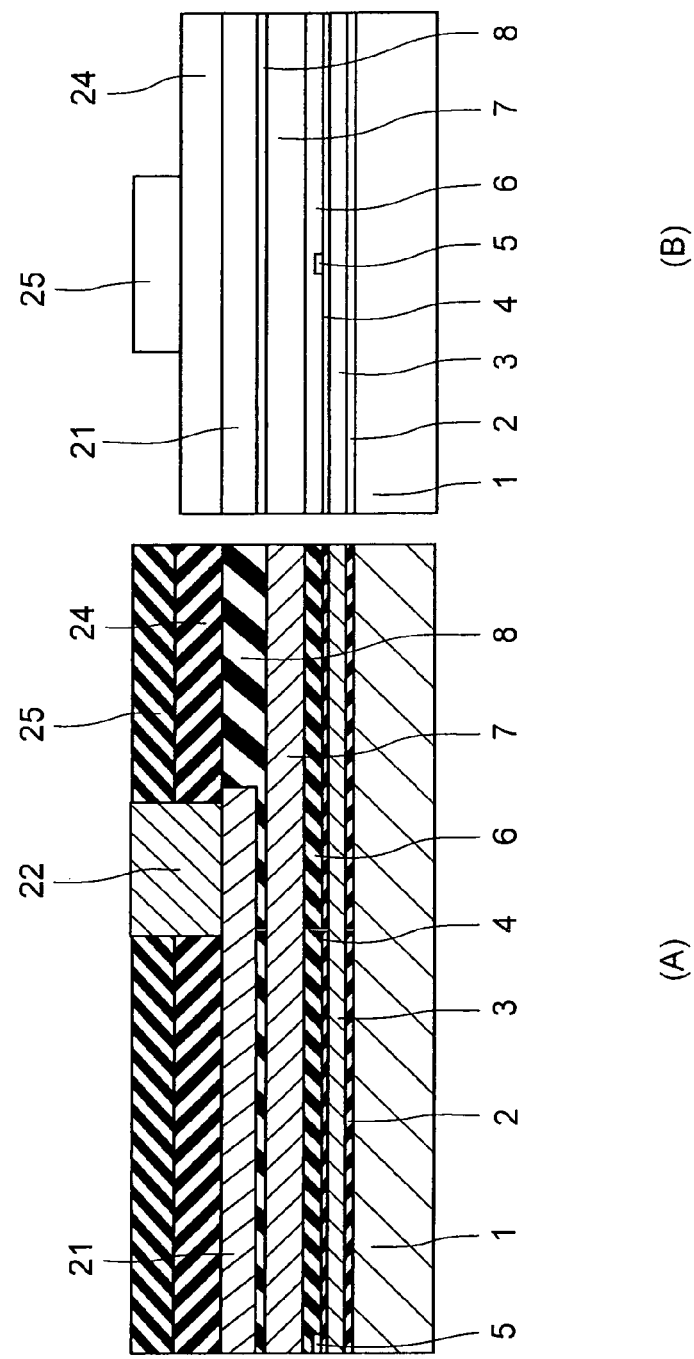
FIG. 10 is a sectional view illustrating a process subsequent to that in FIG. 9, in which (A) is a sectional view corresponding to FIG. 1, (B) is a sectional view corresponding to FIG. 2.
Figure 13:
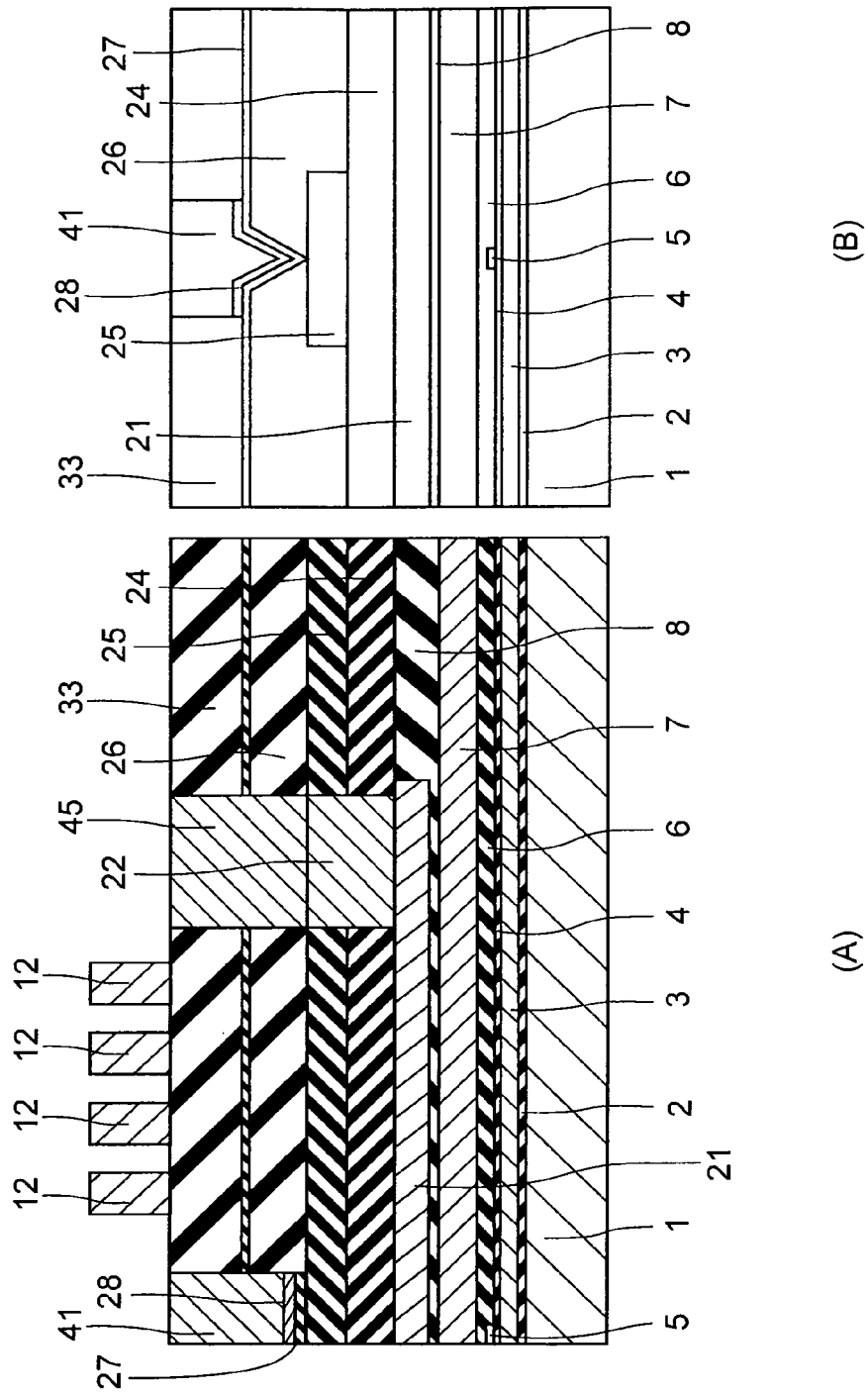
FIG. 13 is a sectional view illustrating a process subsequent to that in FIG. 12, in which (A) is a sectional view corresponding to FIG. 1, (B) is a sectional view corresponding to FIG. 2.

Next, a method of manufacturing the thermally assisted magnetic head 100 having the structure mentioned above will now be explained with reference to FIG. 8(A), (B) to FIG. 13(A), (B) and FIG. 14 to FIG. 17 together with FIG. 1 and FIG. 2 mentioned above.

Here, FIG. 8(A) to FIG. 13(A) are sectional views corresponding to FIG. 1 in the processes of manufacturing the thermally assisted magnetic head 100, and FIG. 8(B) to FIG. 13(B) are front views corresponding to FIG. 2 of the same. In the drawings, the left end face in (A) indicates a position (a planned opposing surface position) which will become the ABS 101 afterward.

First, the substrate 1 made of a ceramic material such as aluminum oxide-titanium carbide ($Al_2O_3.TiC$) is prepared. Subsequently, as shown in FIG. 8(A), (B), the insulating layer 2 made of an insulating material such as alumina ($Al_2O_3$) or the like, the lower shield layer 3 made of a magnetic material and the lower shield gap film 4 are successively laminated on the substrate 1.

Next, the upper shield gap film 6 is formed by an insulating material such as to shield the MR device 5. Here, an undepicted lead connected to the MR device 5 is formed, and the MR device 5 and lead are covered with the upper shield gap film 6. Thereafter, using a magnetic material, the upper shield layer 7 is formed on the upper shield gap film 6.

Then, on the upper shield layer 7, the insulating layer 8 is formed using an insulating material such as alumina ($Al_2O_3$) or the like. Thereafter, a portion of the insulating layer 8 which is located on the planned opposing surface position side is removed, and the connecting magnetic pole layer 21 is formed using a magnetic material such as CoNiFe, CoFe, NiFe, CoFeN or the like.

Then, as illustrated in FIG. 9(A), (B), an insulating layer 24 is formed on the whole surface of the laminated body using an insulating material such as alumina ($Al_2O_3$) or the like, and portions of the insulating layer 24 where the front magnetic pole layer 22 will be formed is removed. Subsequently, the rear magnetic pole layer 22 is formed at the open portions of the insulating layer 24, for example, by the frame plating method.

Then, an optical waveguide forming process is performed. In this optical waveguide forming process, as illustrated in FIG. 10(A), (B), a dielectric substance layer is formed using a dielectric substance such as $Ta_2O_5$ or the like transmitting the laser light, and a portion of the dielectric substance layer is removed to form the optical waveguide 25.

After forming the optical waveguide 25 by performing the optical waveguide forming process, the base dielectric substance layer 26 is formed on the surface of the laminated body using a dielectric substance such as alumina ($Al_2O_3$) or the like as shown in FIG. 11(A), (B).

Thereafter, a groove part forming process is preformed on the base dielectric substance layer 26. In this groove part forming process, the base groove part 61 is formed. The base groove part 61 is formed by performing etching on a region (referred also to as a groove part forming region) from the planned opposing surface position to a position corresponding to the backward length of the near-field light generating layer 28. More specifically, the base groove part 61 is formed in the following manner.

Figure 14:
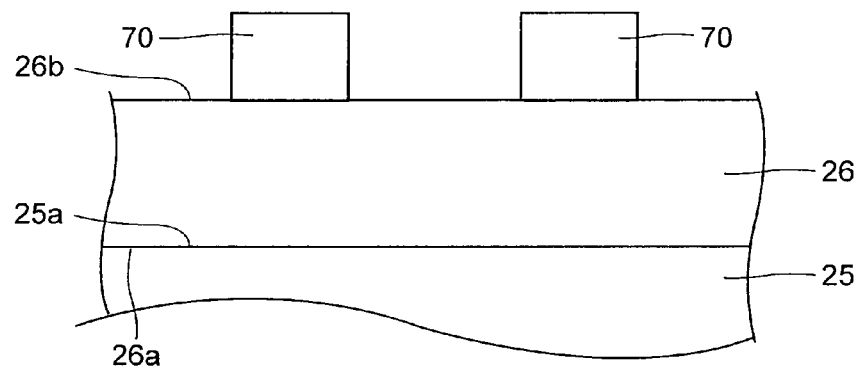
FIG. 14 is a front view, seen from the ABS, illustrating a base dielectric substance layer and an optical waveguide before forming of the base groove part.

First, photoresist is applied to the surface of the laminated body, and patterning is then performed using a not-shown photomask to form a resist pattern 70 on both sides of the base groove part 61 to be formed as shown in FIG. 14. At this stage, the base groove part 61 has not been formed yet and therefore the base groove part 61 is not shown in FIG. 14.

Next, etching (for example, reactive ion etching, referred also to as RIE) is performed using the resist pattern 70 as a mask to remove the surface of the base dielectric substance layer 26 so that the shape of the section of the base dielectric substance layer 26 becomes a V-shape as shown in FIG. 15. By this process, the base groove part 61 is formed. In this event, the base groove part 61 is formed such that the valley bottom part 61b reaches the front face 25a of the optical waveguide 25.

Figure 11:
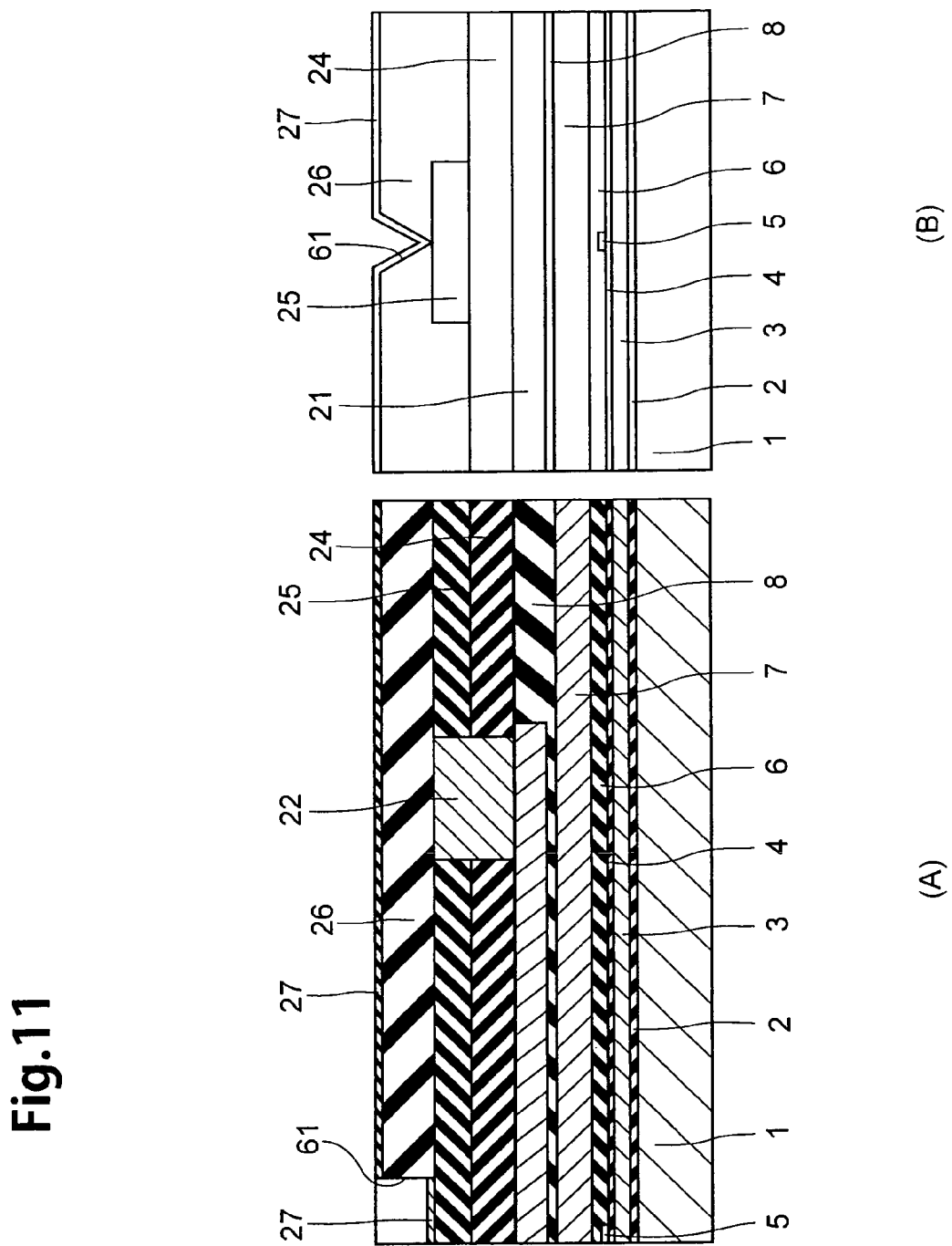
FIG. 11 is a sectional view illustrating a process subsequent to that in FIG. 10, in which (A) is a sectional view corresponding to FIG. 1, (B) is a sectional view corresponding to FIG. 2.

Subsequently, an interposed layer forming process is performed. In the interposed layer forming process, the interposed layer 27 in direct contact with the base groove part 61 is formed. First, the resist pattern 70 is removed. Then, a film made of a dielectric substance such as alumina or the like is formed on the whole surface of the laminated body, for example, by atomic layer deposition to form the interposed layer 27 as shown in FIG. 16 and FIG. 11. Portions of the formed interposed layer 27 which are formed inside the base groove part 61 become the in-groove interposed layers 27a. Further, portions in a band shape connected to the in-groove interposed layers 27a along the base groove part 61 become the strip-like regions 27b.

Figure 12:
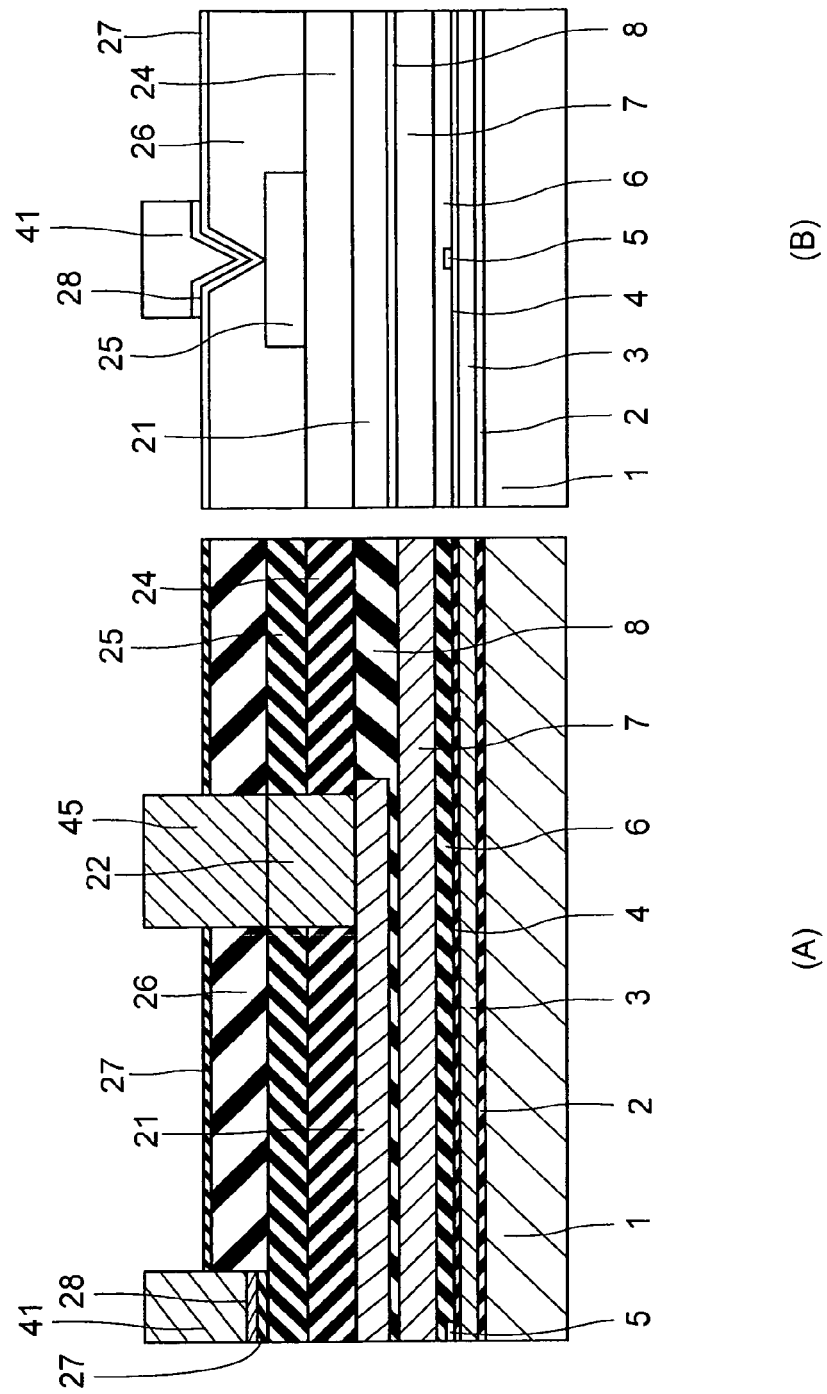
FIG. 12 is a sectional view illustrating a process subsequent to that in FIG. 11, in which (A) is a sectional view corresponding to FIG. 1, (B) is a sectional view corresponding to FIG. 2.
Figure 17:
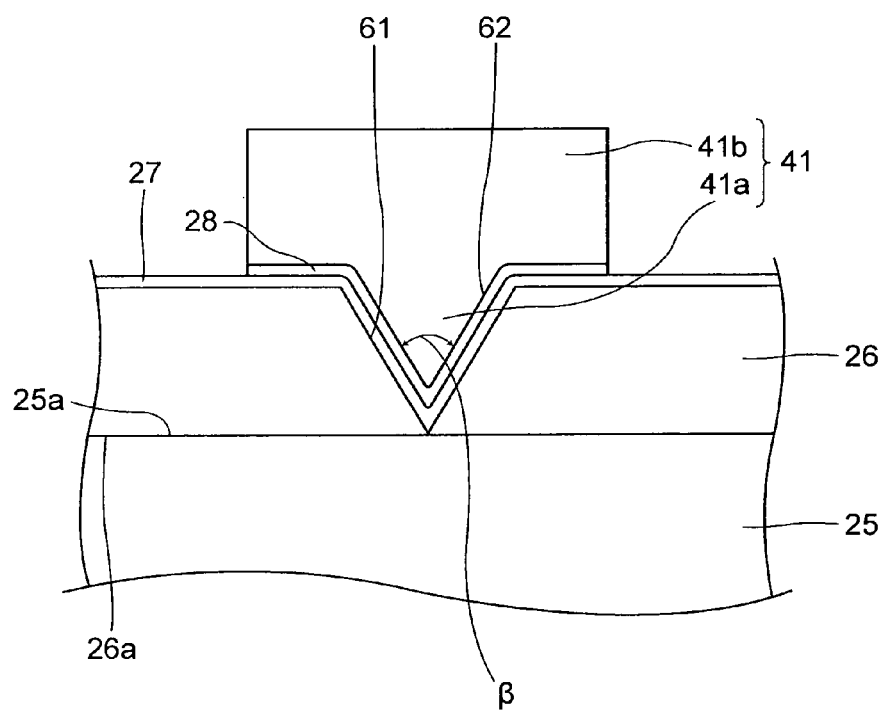
FIG. 17 is a front view, seen from the ABS, illustrating a base dielectric substance layer and an optical waveguide after forming of the near-field light generating layer and the magnetic pole end part layer.

Then, a generating layer forming process is performed to form the near-field light generating layer 28. In this generating layer forming process, a deposition of a metal by physical vapor deposition is performed to form the near-field light generating layer 28 in the thin film structure as shown in FIG. 17 and FIG. 12. The deposition of a metal is performed on the in-groove interposed layers 27a and on the strip-like regions 27b. Further, sputtering, vacuum vapor deposition or the like is performing using, for example, one of Au, Ag, Al, Cu, Pd, Pt, Rh, Ir or an alloy made of a plurality of those elements. In this case, the deposition of a metal is performed by arranging a mask (not shown) such as to expose the in-groove interposed layers 27a and the strip-like regions 27b and cover other portions.

Especially in the generating layer forming process, the in-groove generating layers 28a are formed by the deposition of a metal such that the inner groove part 62 as the non-embedded region in which no metal is embedded is left inside the base groove part 61. Therefore, in the generating layer forming process, it is preferable to enhance the deposit efficiency of metal atoms and molecules to the inside of the base groove part 61 by collimate sputtering, long throw sputtering or the like. Further, by performing the deposition of a metal on the strip-like regions 27b as described above, the near-field light generating layer 28 having the extended parts 28b is able to be formed. In this event, the inner groove part 62 is formed inside the base groove part 61 by the in-groove generating layers 28a of the near-field light generating layer 28.

Subsequently, a main magnetic pole layer forming process is performed. In the main magnetic pole layer forming process, sputtering, vacuum vapor deposition or the like is first performed with the mask left. Thus, CoNiFe, CoFe, NiFe or the like is embedded in the whole inside of the inner grove part 62 that has been left as the non-embedded region in the generating layer forming process, and a magnetic material is deposited on the extended parts 28b to form the magnetic pole end layer 41.

Thereafter, regions of the base dielectric substance layer 26 and the interposed layer 27 where the rear magnetic pole layer 22 is formed are removed, and then sputtering, vacuum vapor deposition or the like is performed to form the linking magnetic pole layer 45.

Next, as illustrated in FIG. 13(A), (B), an insulating layer 33 is formed on the whole surface of the laminated body using an insulating material such as alumina ($Al_2O_3$) or the like. Thereafter, a polishing by the CMP is performed until the magnetic pole end part layer 41 and the linking magnetic pole layer 45 emerges so as to make the surface flat. Thereafter, the thin-film coil 12 is formed on the insulating layer 33, for example, by the frame plating method.

Subsequently, photoresist is applied to the surface of the laminated body and patterned using a predetermined photomask to form the photoresist layer 13 covering the thin-film coil 12. Then, the yoke magnetic pole layer 42 is formed using a magnetic material such as CoNiFe, CoFe, NiFe or the like such that the front magnetic pole layer 42c is arranged at the planned opposing surface position and the yoke magnetic pole layer 42 is connected to the linking magnetic pole layer 45 straddling the thin-film coil 12. Thus, the main magnetic pole layer 40 is formed. Further, after an overcoat layer 34 made of an insulating material such as alumina ($Al_2O_3$) or the like is formed on the whole surface of the laminated body, the thermally assisted magnetic head 100 is manufactured.

As described above, the deposition of a metal by physical vapor deposition is performed to form the near-field light generating layer 28 in the thermally assisted magnetic head 100. When the near-field light generating layer 28 is formed, the polishing by the CMP has not been performed. Accordingly, the whole surface of the near-field light generating layer 28 is the non-polished surface, and therefore there is no possibility of occurrence of a loss accompanying corrosion of the surface when the laser light or the evanescent light is taken in. Thus, the thermally assisted magnetic head 100 is able to very efficiently generate near-field light by the near-field light generating layer 28.

Modified Example

Figure 18:
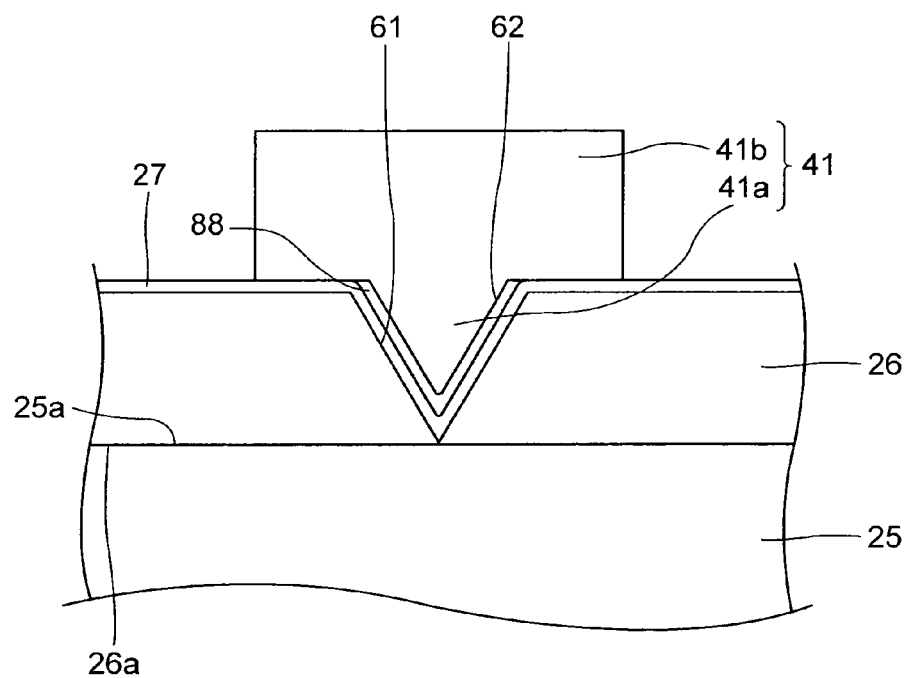
FIG. 18 is a front view, seen from the ABS, illustrating a base dielectric substance layer and an optical waveguide, according to a modified example, after forming of the near-field light generating layer and the magnetic pole end part layer.

In the above-described thermally assisted magnetic head 100, a near-field light generating layer 88 illustrated in FIG. 18 may be formed in place of the near-field light generating layer 28. The near-field light generating layer 88 is different from the near-field light generating layer 28 in that the near-field light generating layer 88 does not have the extending parts 28b, 28b, and is the same as the near-field light generating layer 28 in other points. Since this near-field light generating layer 88 also has the in-groove generating layers 28a similar with the near-field light generating layer 28, the whole surface of the near-field light generating layer 88 is a non-polished surface. Accordingly, in the near-field light generating layer 88, there is no possibility of occurrence of a loss accompanying corrosion of the surface when the laser light or the evanescent light is taken in. Thus, the near-field light generating layer 88 is able to very efficiently generate near-field light similar with the near-field light generating layer 28.

Embodiments of Head Gimbal Assembly and Hard Disk Drive

Embodiments of the head gimbal assembly and hard disk drive will now be explained with reference to FIG. 19 to FIG. 22.

FIG. 19 is a perspective view showing a hard disk drive 201 equipped with the above-mentioned thermally assisted magnetic head 100. The hard disk drive 201 includes a hard disk (magnetic recording medium) 202 rotating at a high speed and a head gimbal assembly (HGA) 210. The hard disk drive 201 is an apparatus which actuates the HGA 210, so as to record/reproduce data onto/from recording surfaces of the hard disk 202. The hard disk 202 has a plurality of (4 in the drawing) platters. Each platter has a recording surface opposing its corresponding thermally assisted magnetic head 100.

The hard disk drive 201 positions a slider 230 on a track by an assembly carriage device 203. Further, the hard disk drive 201 has a plurality of drive arms 209. The drive arms pivot about a pivot bearing shaft 206 by means of a voice coil motor (VCM) 205, and are stacked in a direction along the pivot bearing shaft 206. Further, an HGA 210 is attached to the tip of each drive arm.

Further, the hard disk drive 201 has a semiconductor laser 207 generating laser light for heating, a control circuit 204 controlling recording/reproducing and the generation of light by the semiconductor laser 207, and an optical fiber 208 guiding the laser light to the slider 230.

Figure 20:
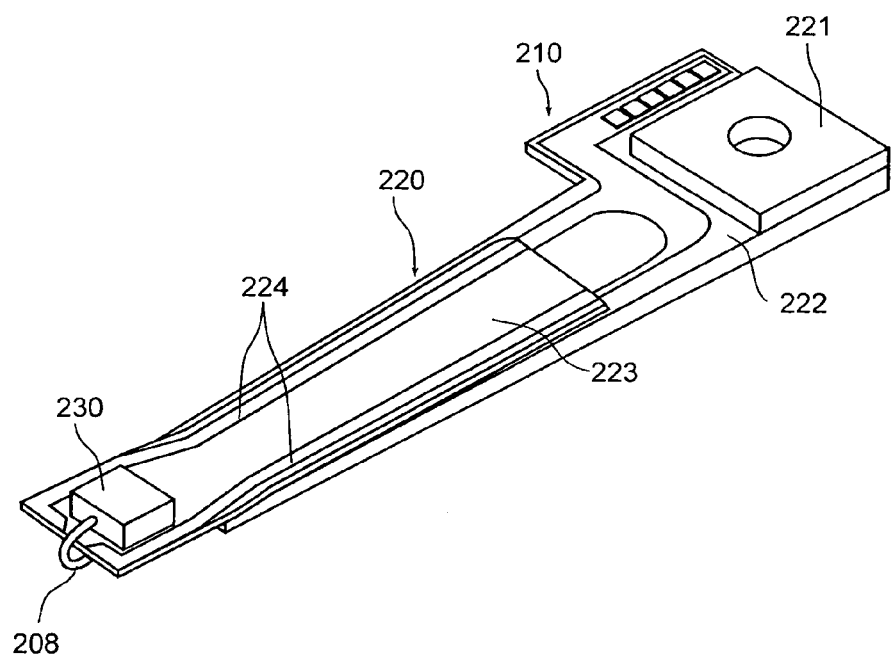
FIG. 20 is a perspective view illustrating a rear side of HGA.

The HGA 210 will now be described with reference to FIG. 20. FIG. 20 is a perspective view illustrating a rear face side of the HGA 210. In the HGA 210, the slider 230 is fixed to a tip portion of a suspension 220. Further, in the HGA 210, one end portion of a wiring member 224 is electrically connected to a terminal electrode of the slider 230.

The suspension 220 has a load beam 222, a base plate 221 provided at a base portion of the load beam 222, a flexure 223 fixed to and supported on the load beam 222 from the tip end side to the front side of the base plate 221 and having elasticity, and the wiring member 224. The wiring member 224 has a lead conductor and connection pads electrically connected to both ends of the lead conductor.

Figure 21:
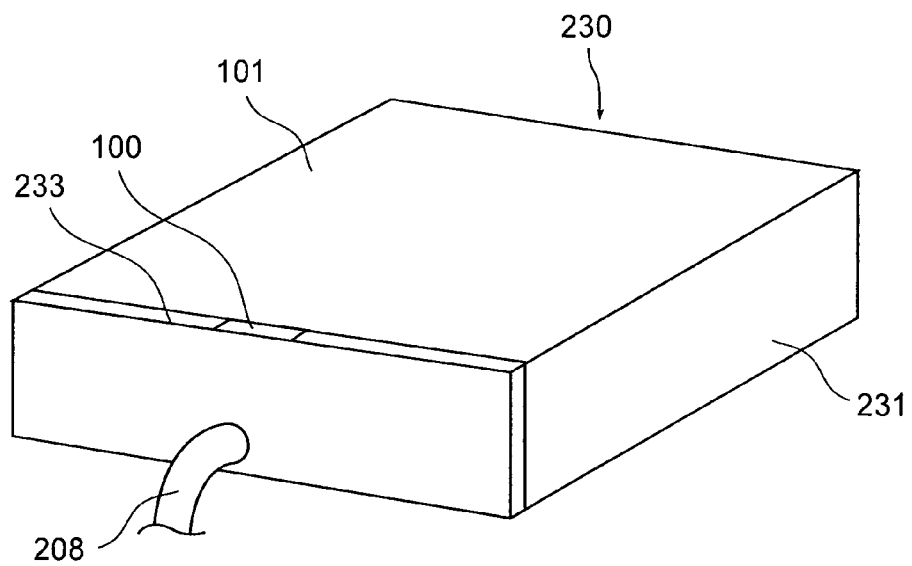
FIG. 21 is a perspective view illustrating a slider.

The slider 230 will now be described with reference to FIG. 21. FIG. 21 is a perspective view illustrating the slider 230. The slider 230 has a slider substrate 231 having the ABS 101 and a device formation part 233, and an output end part of the optical fiber 208 is inserted into the slider 230. Further, the thermally assisted magnetic head 100 is formed at the ABS 101 of the device formation part 233.

Figure 22:
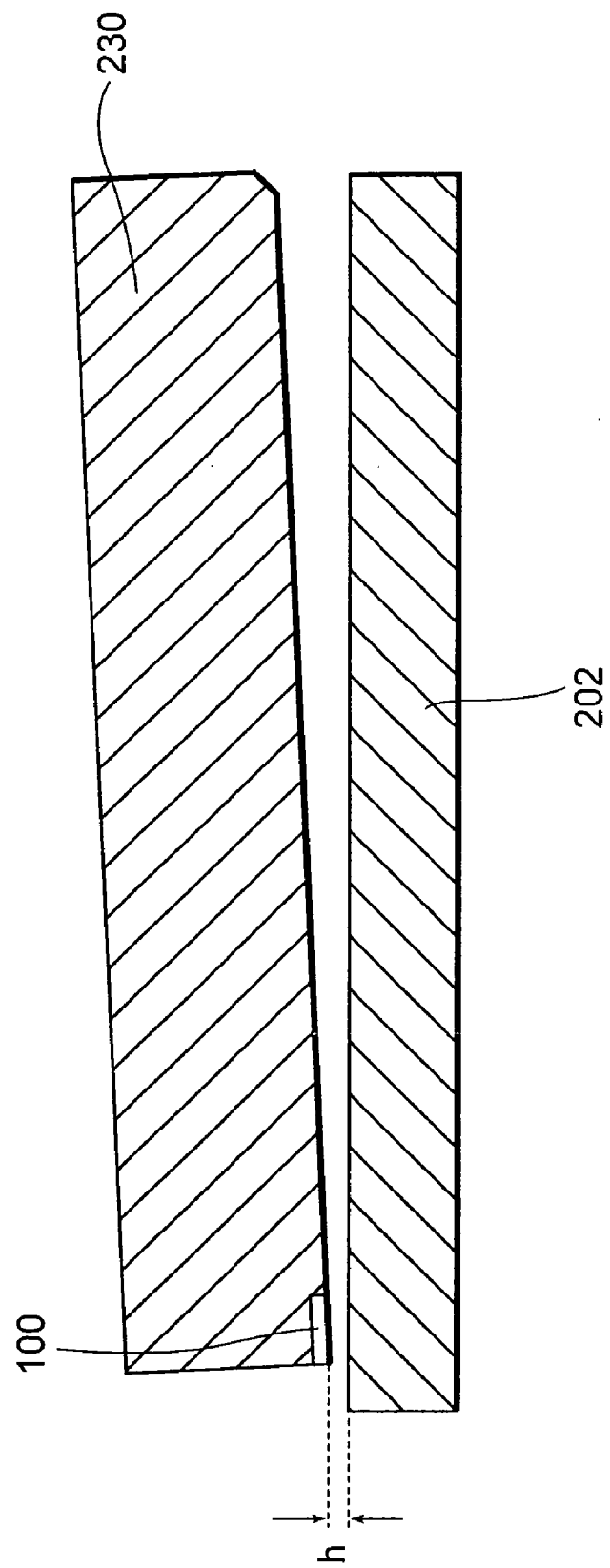
FIG. 22 is a sectional view illustrating a slider equipped with a thermally assisted magnetic head and an example of magnetic recording media.
Figure 23:
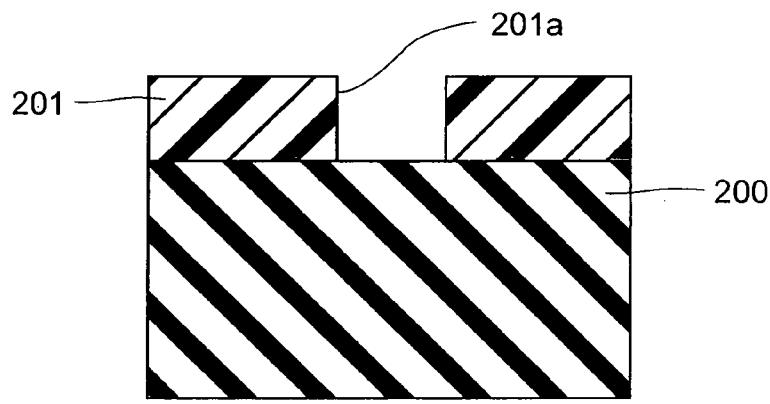
FIG. 23 is a sectional view illustrating an example of a process of forming the plasmon antenna.
Figure 24:
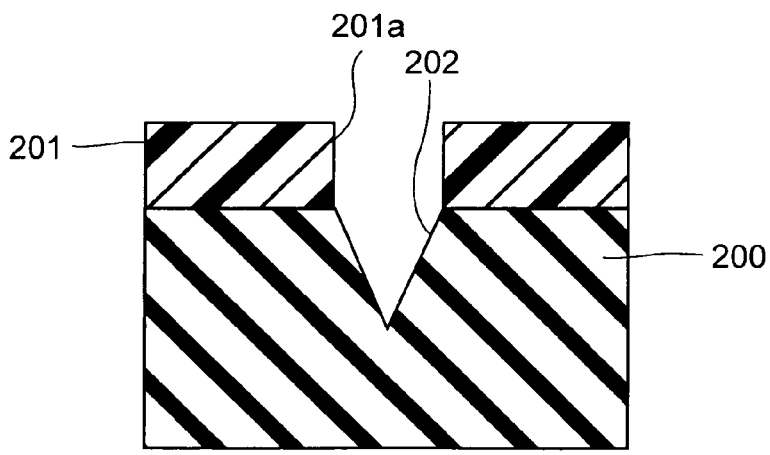
FIG. 24 is a sectional view illustrating a process subsequent to that in FIG. 23.
Figure 25:
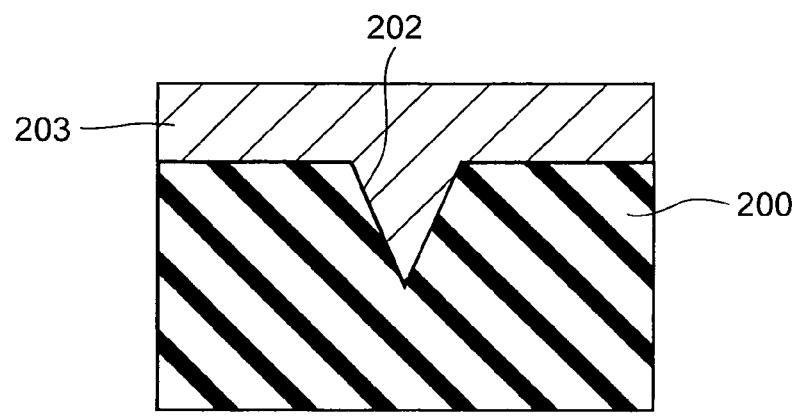
FIG. 25 is a sectional view illustrating a process subsequent to that in FIG. 24.
Figure 26:
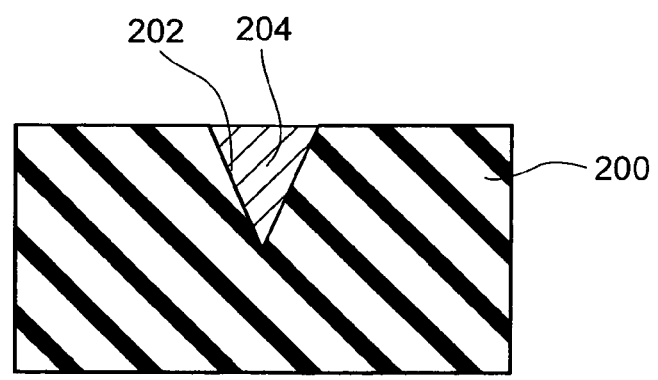
FIG. 26 is a sectional view illustrating a process subsequent to that in FIG. 25.

The thermally assisted magnetic head 100 is incorporated in a later-described slider 230 as illustrated in FIG. 22 too, and this slider 230 floats from the magnetic recording medium 202 by a minute distance h as illustrated in FIG. 22.

In the hard disk drive 201, when the HGA 210 is rotated, the slider 230 moves in a radial direction of the hard disk 202, i.e., a direction traversing track lines.

The aforementioned HGA 210 and hard disk drive 201 have the thermally assisted magnetic head 100, thereby causing the near-field light generating layer 28 to generate more intensive near-field light.

Though the above-mentioned embodiments explain a type in which a thin-film coil is wound like a flat spiral about the main magnetic pole layer by way of example, the present invention is also applicable to a type in which the thin-film coil is wound helically about the main magnetic pole layer.

What is claimed is:

1. A thermally assisted magnetic head comprising a main magnetic pole layer having a magnetic pole end face arranged within a medium-opposing surface opposing a magnetic recording medium; a near-field light generating layer having a generating end part arranged within the medium-opposing surface, the generating end part generating near-field light for heating the magnetic recording medium; and an optical waveguide guiding light to the near-field light generating layer, the thermally assisted magnetic head comprising:

a base layer which a base groove part having a width gradually getting smaller along a depth direction and extending in an intersecting direction intersecting with the medium-opposing surface is formed, wherein the near-field light generating layer has an in-groove generating layer formed inside of the base groove part in the base layer, wherein the in-groove generating layer is configured such that a portion arranged within the medium-opposing surface of a deepest part arranged at a deepest position constitutes the generating end part, and wherein the in-groove generating layer is formed along an inner wall surface of the base groove part and has a thin-film like structure in which an inner groove part, having the width gradually getting smaller along the depth direction, smaller in size than the base groove part is formed in the base groove part.

2. A thermally assisted magnetic head according to claim 1, further comprising:

an interposed layer in direct contact with the base groove part in the base layer, wherein the in-groove generating layer is formed on the interposed layer.

3. A thermally assisted magnetic head according to claim 2, wherein the main magnetic pole layer has an in-groove magnetic pole layer formed inside the inner groove part and having a tapered shape according to the inner groove part, wherein the in-groove magnetic pole layer is configured such that a portion arranged within the medium-opposing surface constitutes the magnetic pole end face, and wherein the in-groove magnetic pole layer is formed in direct contact with an in-groove surface of the in-groove generating layer, and an end face arranged within the medium-opposing surface of an edge part with a smallest width is a front end part in direct contact with the generating end part.

4. A thermally assisted magnetic head according to claim 3, wherein the magnetic pole end face of the main magnetic pole layer is formed in an isosceles triangle in which two sides connected to the front end part are equal in length.

5. A thermally assisted magnetic head according to claim 1, wherein the near-field light generating layer further has an extended part connected to an upper end portion of the in-groove generating layer and formed in a strip-like shape along a front face of the base layer, and an in-groove surface fronting the inner groove part is a flat face.

6. A thermally assisted magnetic head according to claim 5, wherein the main magnetic pole layer is composed of an in-groove magnetic pole layer formed inside the inner groove part and having a tapered shape according to the inner groove part, and an out-groove magnetic pole layer formed outside the inner groove part, in one united body, wherein the in-groove magnetic pole layer is configured such that a portion arranged within the medium-opposing surface constitutes the magnetic pole end face, wherein the in-groove magnetic pole layer is formed in direct contact with the in-groove surface of the in-groove generating layer, and an end face arranged within the medium-opposing surface of an edge part with a smallest width is a front end part in direct contact with the generating end part, and wherein the out-groove magnetic pole layer has a bulge-out part in contact with the extended part from a front side.

7. A thermally assisted magnetic head according to claim 1, wherein the optical waveguide is in contact with a rear face of the base layer where the base groove part is not formed.

8. A thermally assisted magnetic head according to claim 7, wherein the base groove part has a deep groove structure in which a valley bottom part arranged at a deepest position reaches a front face of the optical waveguide.

9. A thermally assisted magnetic head according to claim 1, wherein both of the base groove part and the inner groove part are formed having sections in a V-shape.

10. A head gimbal assembly comprising a slider having a thermally assisted magnetic head, wherein the thermally assisted magnetic head comprising:

a main magnetic pole layer having a magnetic pole end face arranged within a medium-opposing surface opposing a magnetic recording medium; a near-field light generating layer having a generating end part arranged within the medium-opposing surface, the generating end pact generating near-field light for heating the magnetic recording medium; and an optical waveguide guiding light to the near-field light generating layer, a base layer which a base groove part having a width gradually getting smaller along a depth direction and extending in an intersecting direction intersecting with the medium-opposing surface is formed, wherein the near-field light generating layer has an in-groove generating layer formed inside of the base groove part in the base layer, wherein the in-groove generating layer is configured such that a portion arranged within the medium-opposing surface of a deepest part arranged at a deepest position constitutes the generating end part, and wherein the in-groove generating layer is formed along an inner wall surface of the base groove part and has a thin-film like structure in which an inner groove part, having the width gradually getting smaller along the depth direction, smaller in size than the base groove part is formed in the base groove part.

11. A hard disk drive comprising a head gimbal assembly having a thermally assisted magnetic head, and a magnetic recording medium opposing the thermally assisted magnetic head, wherein the thermally assisted magnetic head comprising:

a main magnetic pole layer having a magnetic pole end face arranged within a medium-opposing surface opposing a magnetic recording medium; a near-field light generating layer having a generating end part arranged within the medium-opposing surface, the generating end part generating near-field light for heating the magnetic recording medium; and an optical waveguide guiding light to the near-field light generating layer, a base layer which a base groove part having a width gradually getting smaller along a depth direction and extending in an intersecting direction intersecting with the medium-opposing surface is formed, wherein the near-field light generating layer has an in-groove generating layer formed inside of the base groove part in the base layer, wherein the in-groove generating layer is configured such that a portion arranged within the medium-opposing surface of a deepest part arranged at a deepest position constitutes the generating end part, and wherein the in-groove generating layer is formed along an inner wall surface of the base groove part and has a thin-film like structure in which an inner groove part, having the width gradually getting smaller along the depth direction, smaller in size than the base groove part is formed in the base groove part.

* * * * *

UNITED STATES PATENT AND TRADEMARK OFFICE
CERTIFICATE OF CORRECTION

PATENT NO. : 8,325,441 B2
APPLICATION NO. : 12/662138
DATED : December 4, 2012
INVENTOR(S) : Yoshitaka Sasaki et al.

It is certified that error appears in the above-identified patent and that said Letters Patent is hereby corrected as shown below:

Title Page

Please amend the 1st Assignee as follows:

Item (73): "Milipitas" to Milpitas

Please amend the 2nd Assignee as follows:

Item (73): "SAE Magnetics (H.K.) Ltd., Hong Kong (CN)" to TDK Corporation, Tokyo (JP)

Signed and Sealed this
Thirtieth Day of April, 2013

Teresa Stanek Rea
*Acting Director of the United States Patent and Trademark Office*